(12) United States Patent
Kato et al.

(10) Patent No.: US 11,445,080 B2
(45) Date of Patent: Sep. 13, 2022

(54) SHEET FOLDING APPARATUS AND IMAGE FORMING SYSTEM HAVING THE SAME

(71) Applicants: Shoubu Kato, Yamanashi-ken (JP); Shogo Iwai, Yamanashi-ken (JP); Akito Yoda, Yamanashi-ken (JP); Shinnosuke Enomoto, Yamanashi-ken (JP)

(72) Inventors: Shoubu Kato, Yamanashi-ken (JP); Shogo Iwai, Yamanashi-ken (JP); Akito Yoda, Yamanashi-ken (JP); Shinnosuke Enomoto, Yamanashi-ken (JP)

(73) Assignee: CANON FINETECH NISCA INC., Misato (JP)

( * ) Notice: Subject to any disclaimer, the term of this patent is extended or adjusted under 35 U.S.C. 154(b) by 0 days.

(21) Appl. No.: 17/346,829

(22) Filed: Jun. 14, 2021

(65) Prior Publication Data
US 2021/0400156 A1 Dec. 23, 2021

(30) Foreign Application Priority Data
Jun. 17, 2020 (JP) .............................. JP2020-104397

(51) Int. Cl.
*H04N 1/04* (2006.01)
*H04N 1/00* (2006.01)
*B65H 5/06* (2006.01)
*B65H 37/06* (2006.01)

(52) U.S. Cl.
CPC ......... *H04N 1/00639* (2013.01); *B65H 5/062* (2013.01); *B65H 37/06* (2013.01); *H04N 1/00559* (2013.01); *H04N 1/00602* (2013.01)

(58) Field of Classification Search
CPC .......... H04N 1/00639; H04N 1/00559; H04N 1/00602; B65H 5/062; B65H 37/06
USPC ......................................................... 358/498
See application file for complete search history.

(56) References Cited

U.S. PATENT DOCUMENTS

| | | | |
|---|---|---|---|
| 2020/0180898 A1* | 6/2020 | Enomoto | B65H 45/30 |
| 2020/0180899 A1* | 6/2020 | Enomoto | B65H 9/006 |
| 2020/0324994 A1* | 10/2020 | Atsumi | B65H 45/20 |

FOREIGN PATENT DOCUMENTS

| | | |
|---|---|---|
| JP | 2002-068583 A | 3/2002 |
| JP | 2008-189404 A | 8/2008 |

* cited by examiner

*Primary Examiner* — Cheukfan Lee
(74) *Attorney, Agent, or Firm* — Manabu Kanesaka

(57) ABSTRACT

A sheet folding apparatus includes: a conveying roller conveying a sheet in a predetermined conveying direction; a folding roller pair disposed downstream of the conveying roller in the conveying direction and rotating while nipping a predetermined position of the sheet to form a fold; a conveying path for conveying the sheet in the conveying direction from the conveying roller to the folding roller pair; an abutting member moving downstream in the conveying direction and abutting against the predetermined position of the sheet to bend the sheet downstream; and a loop space where the sheet is bent between the conveying roller and folding roller pair in a direction crossing the conveying direction. The folding roller pair stops while nipping a front end of the sheet fed from to form a loop of the sheet in the loop space, and the abutting member moves to abut against the loop.

8 Claims, 14 Drawing Sheets

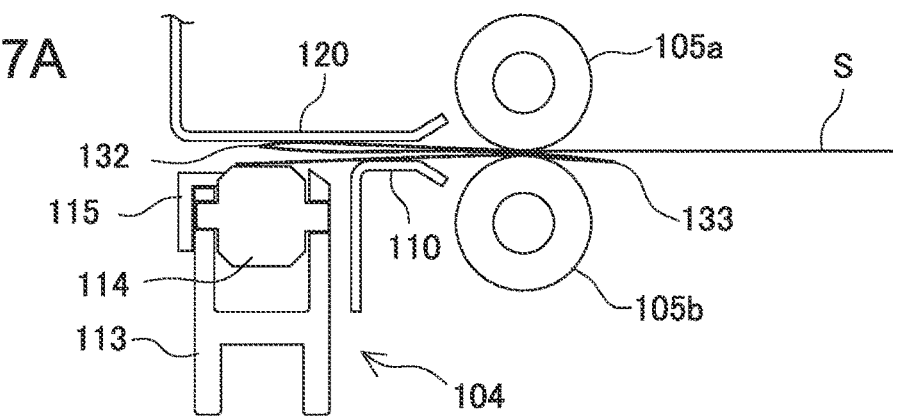
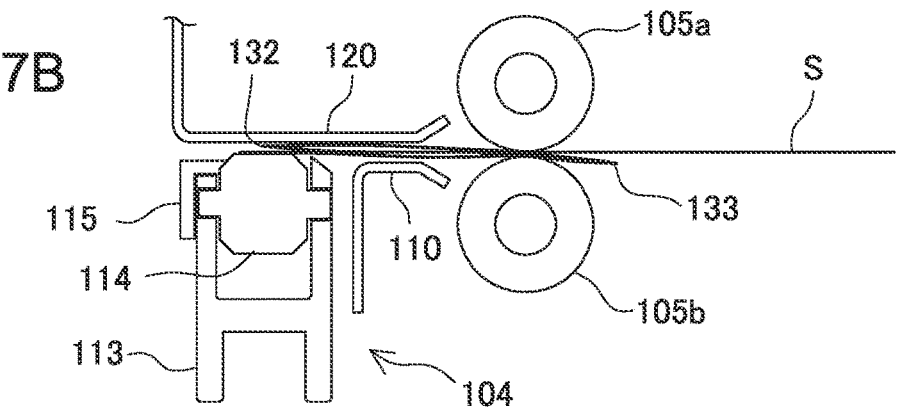
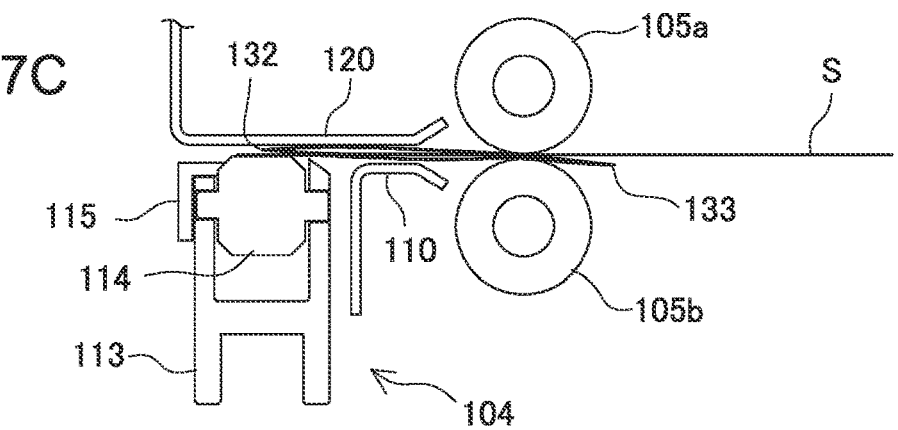
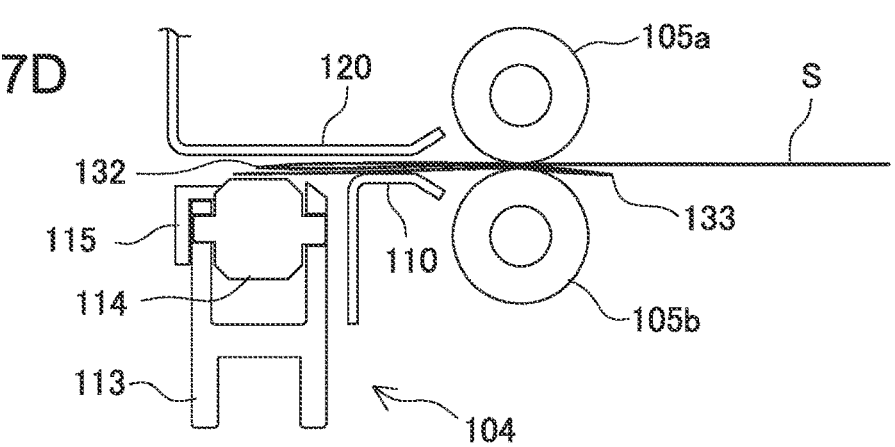

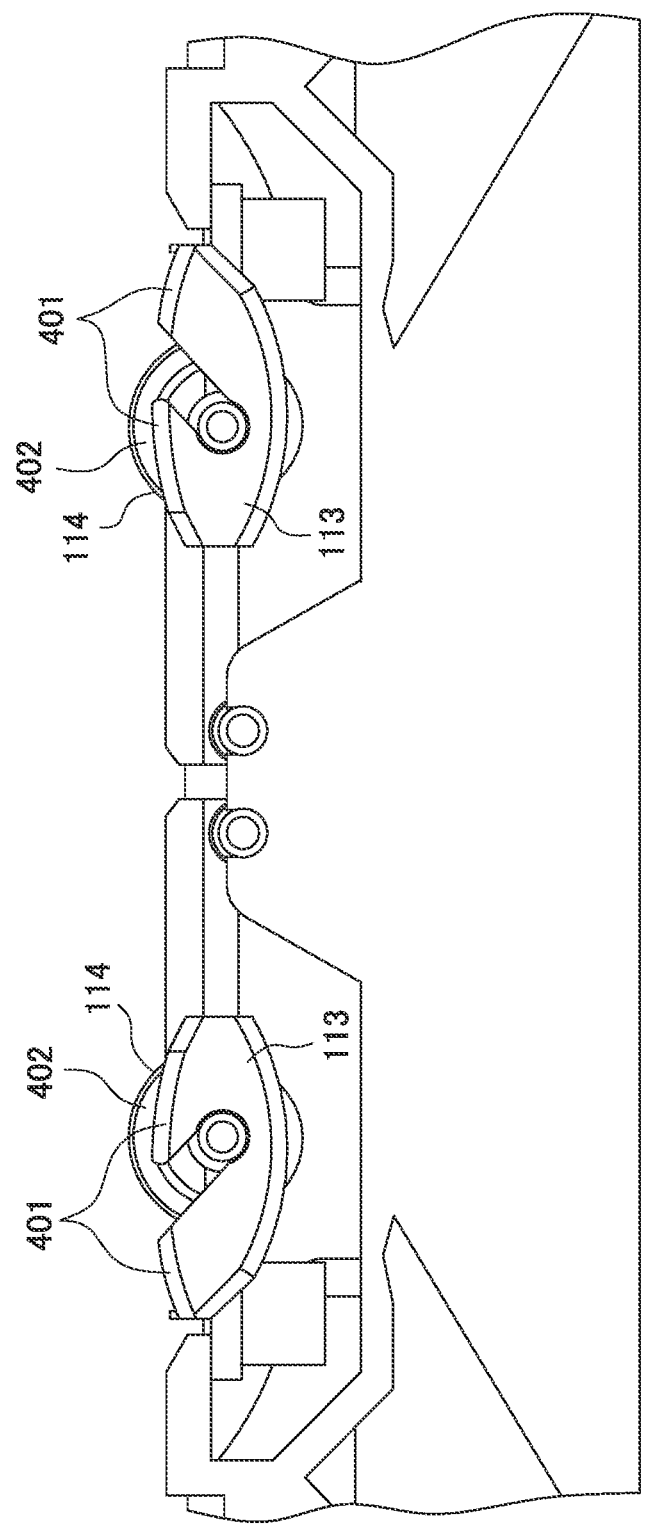

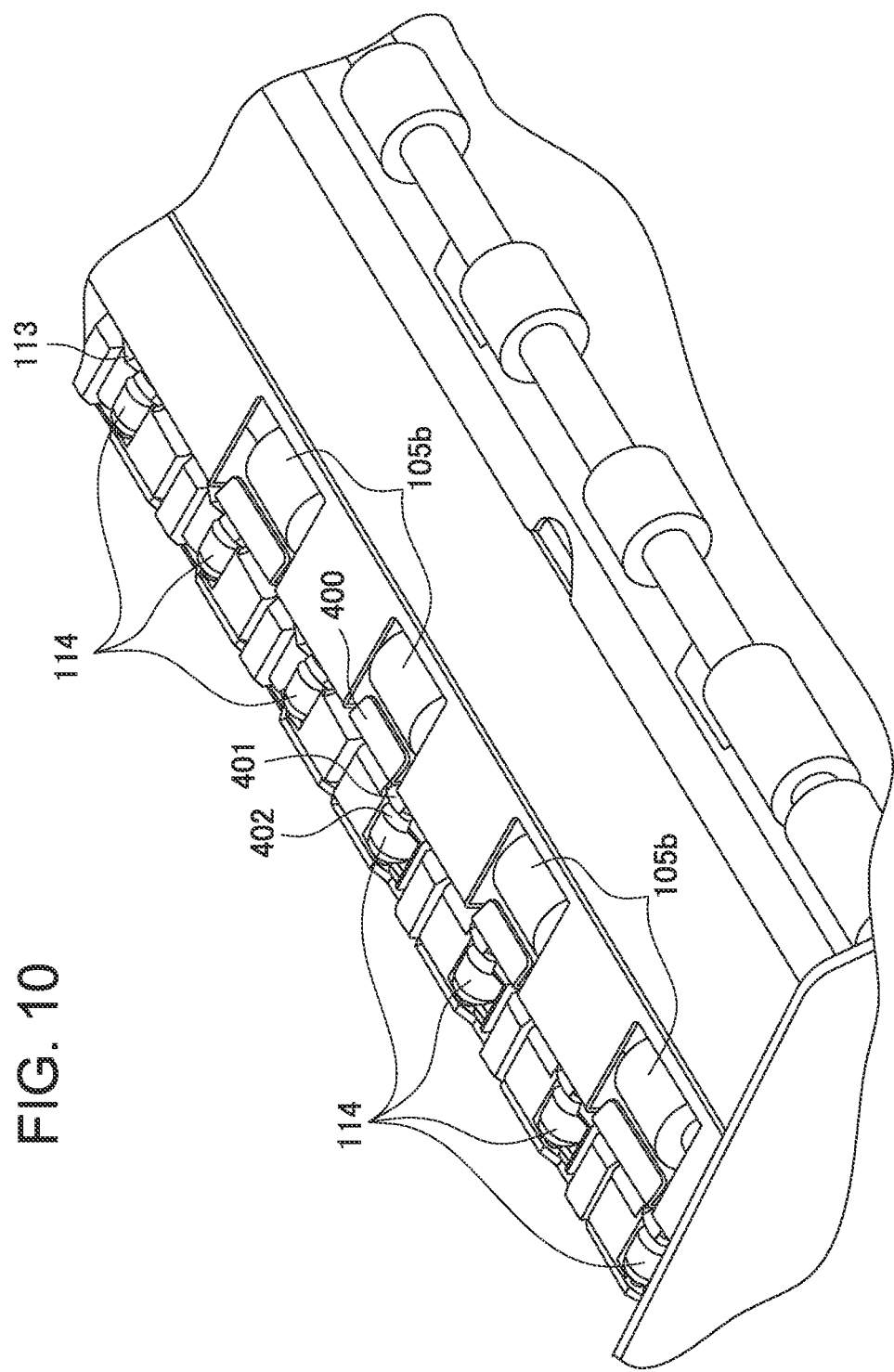

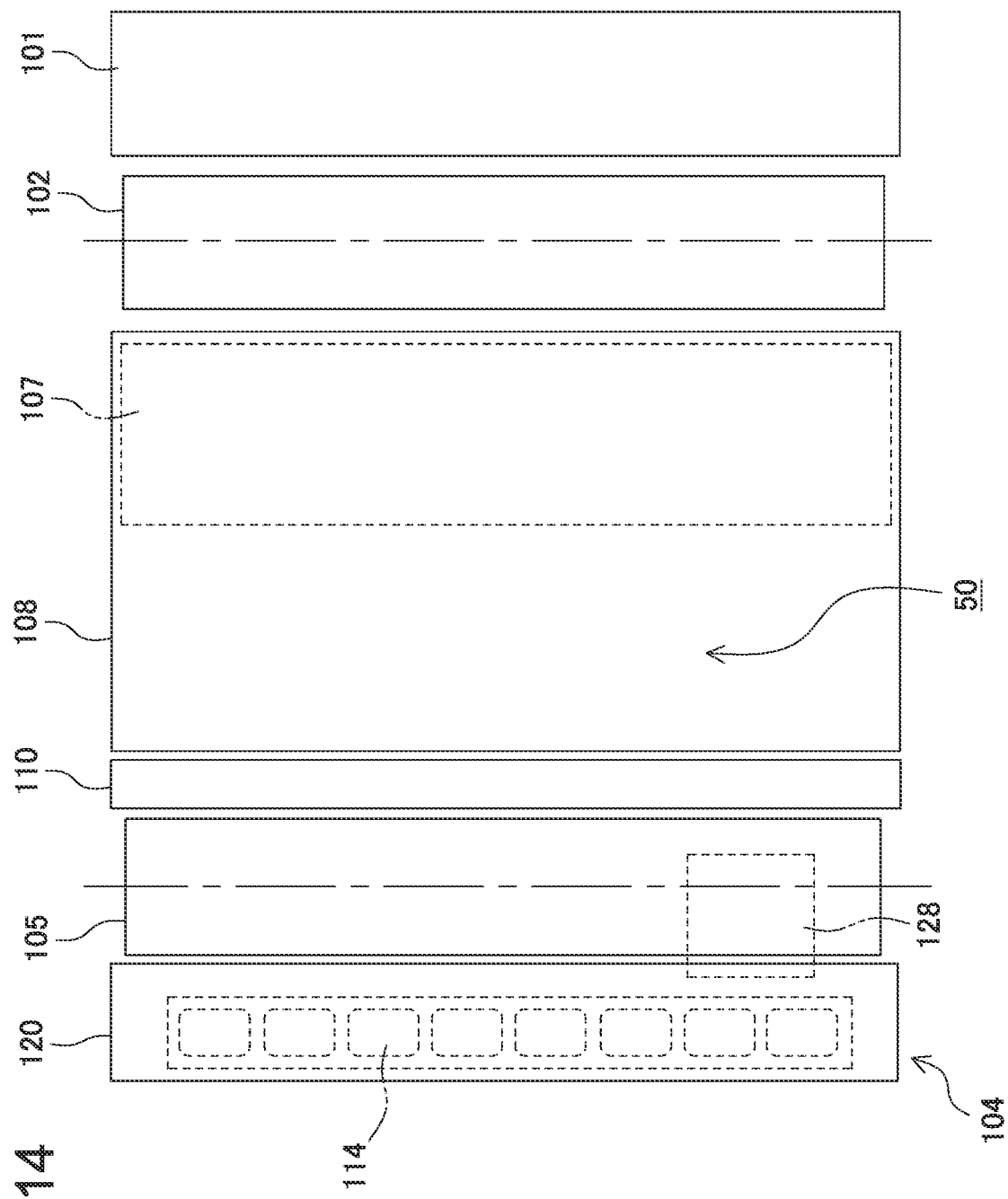

SHEET FOLDING APPARATUS AND IMAGE FORMING SYSTEM HAVING THE SAME

FIELD OF THE INVENTION

The present invention relates to a sheet folding apparatus that folds a sheet and an image forming system, such as a copier, a printer, a facsimile, or a multifunctional machine combining these devices, having the sheet folding apparatus.

BACKGROUND ART

There is known a sheet folding apparatus (post-processing apparatus) installed in an image forming system such as a copier or a printer, configured to prevent the thickness of a folded part (fold height) formed in a sheet through folding processing from increasing. Specifically, folding processing is performed once for a sheet in a folding processing part to form a fold, and then the formed fold is pressed (additionally folded) with a pressing member provided separately from the folding processing part.

For example, Japanese Patent Application Publication No. 2002-68583 (Patent Document 1) discloses a sheet folding apparatus configured to form a loop in a conveyed sheet utilizing a space formed in a conveying path and make an abutting plate abut against the loop to fold the sheet.

Further, Japanese Patent Application Publication No. 2008-189404 (Patent Document 2) discloses an additional folding mechanism having a roller support member supporting a plurality of rollers arranged along the fold of a conveyed booklet and configured to move the roller support member along the fold while pressing the fold between the rollers and a sheet placing table. More specifically, the roller support member has an L-shape formed by a horizontal plate parallel to the sheet placing plate and a vertical plate extending perpendicular to the horizontal plate in a direction along the fold of the booklet. A shaft guide is fixed to a movable pressing unit that presses the rollers against the fold while moving the roller support member along the fold of the booklet, and a shaft is fixed to the vertical plate so as to be inclined relative to the fold of the sheet on the sheet placing table. With this configuration, the shaft is moved relative to the shaft guide with pressing/movement of the movable pressing unit to thereby move the roller support member along the fold of the booklet.

PRIOR ART DOCUMENT

Patent Document

[Patent Document 1] Japanese Patent Application Publication No. 2002-68583
[Patent Document 2] Japanese Patent Application Publication No. 2008-189404

DISCLOSURE OF INVENTION

Problems to be Solved by the Invention

The sheet folding apparatus disclosed in Patent Document 1 having the above configuration (namely, forming a loop in a conveyed sheet using a space formed in a conveying path and making an abutting plate abut against the loop to fold the sheet) requires a large diameter and heavy roller in order to ensure a nip pressure necessary for folding processing, resulting in an increase in apparatus size and cost.

As another approach, there can be considered a configuration like the invention disclosed in Patent Document 2, in which an additional folding apparatus that passes the fold after folding processing is attached; however, when an additional folding roller rotates in a sheet conveying direction, increase in apparatus size cannot be avoided. Further, there is known an apparatus as disclosed in Patent Document 2 in which a pressing part is moved from a separated position to a pressing position for pressing to perform additional folding; however, apparatus size may increase depending on the arrangement of a moving mechanism.

The present invention has been made to solve the problems of the conventional techniques, and an object thereof is to provide a sheet folding apparatus capable of performing high-quality folding processing while preventing an increase in apparatus size.

Means for Solving the Problem

In view of the above object, a sheet folding apparatus according to the present invention includes: a conveying roller that conveys a sheet in a predetermined conveying direction; a folding roller pair that is disposed downstream of the conveying roller in the conveying direction and rotates while nipping a predetermined position of the sheet to form a fold at the predetermined position; a conveying path for conveying the sheet in the conveying direction from the conveying roller to the folding roller pair; an abutting member that moves downstream in the conveying direction and abuts against the predetermined position of the sheet to bend the sheet downstream such that the predetermined position moves to a position nipped by the folding roller pair; and a loop space where the sheet is bent between the conveying roller and the folding roller pair in a direction crossing the conveying direction, the folding roller pair stopping its rotation while nipping a front end of the sheet fed from the conveying roller to form a loop of the sheet hanging down in the loop space, the abutting member moving so as to abut against the loop in the loop space from the upstream side in the conveying direction to move the predetermined position of the sheet to the position nipped by the folding roller pair. The sheet folding apparatus further includes: a receiving port for receiving the sheet having a fold formed by the folding roller pair and fed in a predetermined direction; a support member that is disposed downstream relative to the receiving port in the conveying direction and is configured movable in a predetermined direction; a first pressing member that is supported by the support member; a second pressing member that is disposed so as to face the first pressing member across the sheet conveying path and presses the fold in cooperation with the first pressing member; and a moving mechanism that moves the support member relative to the second pressing member to move the first pressing member relative to the second pressing member between a pressing position at which the fold of the sheet is pressed between the first and second pressing members and a retreating position obtained by moving the first pressing member from the pressing position in a direction separating from the second pressing member, the loop space and the moving mechanism being disposed on one side relative to the sheet conveying path.

According to the present invention, a moving mechanism that moves an additional folding unit toward a sheet and a space for forming a loop during folding processing are disposed on one side in the vertical direction relative to a sheet conveying path, allowing a reduction in apparatus size.

BRIEF DESCRIPTION OF DRAWINGS

FIGS. 5A to 5D are explanatory views illustrating the operation of an additional folding part when additional folding processing is performed for a sheet in the additional folding unit, in which FIG. 5A illustrates a state where a first fold on the front end side in the receiving direction of the sheet is carried in the additional folding part, FIG. 5B illustrates a state where additional folding rollers are moved to a pressing position to press the first fold of the sheet, FIG. 5C illustrates a state where the additional folding rollers are moved along the first fold of the sheet at the pressing position illustrated in FIG. 5B, and FIG. 5D illustrates a state where the additional folding rollers in the state illustrated in FIG. 5C are moved to a first retreating position;

FIGS. 6A to 6D are explanatory views illustrating the operation of the additional folding part when additional folding processing is performed for the sheet in the additional folding unit, in which FIG. 6A illustrates a state where a second fold on the rear end side in the receiving direction of the sheet is carried in the additional folding part, FIG. 6B illustrates a state where additional folding rollers are moved to the pressing position to press the second fold of the sheet, FIG. 6C illustrates a state where the additional folding rollers are moved along the second fold of the sheet at the pressing position illustrated in FIG. 6B, and FIG. 6D illustrates a state where the additional folding rollers in the state illustrated in FIG. 6C are moved to a second retreating position;

FIGS. 7A to 7D are explanatory views illustrating the operation of the additional folding part when additional folding processing is performed for the sheet in the additional folding unit, which are side views corresponding to FIGS. 5A to 5D, respectively;

FIG. 9 is a view of the additional folding rollers as viewed from the upstream side in a sheet conveying direction;

FIG. 10 is a perspective view of the additional folding rollers and their peripheral portion;

FIG. 14 is an explanatory view schematically illustrating the configuration illustrated in FIG. 2 in a top view.

MODE FOR CARRYING OUT THE INVENTION

Figure 1:
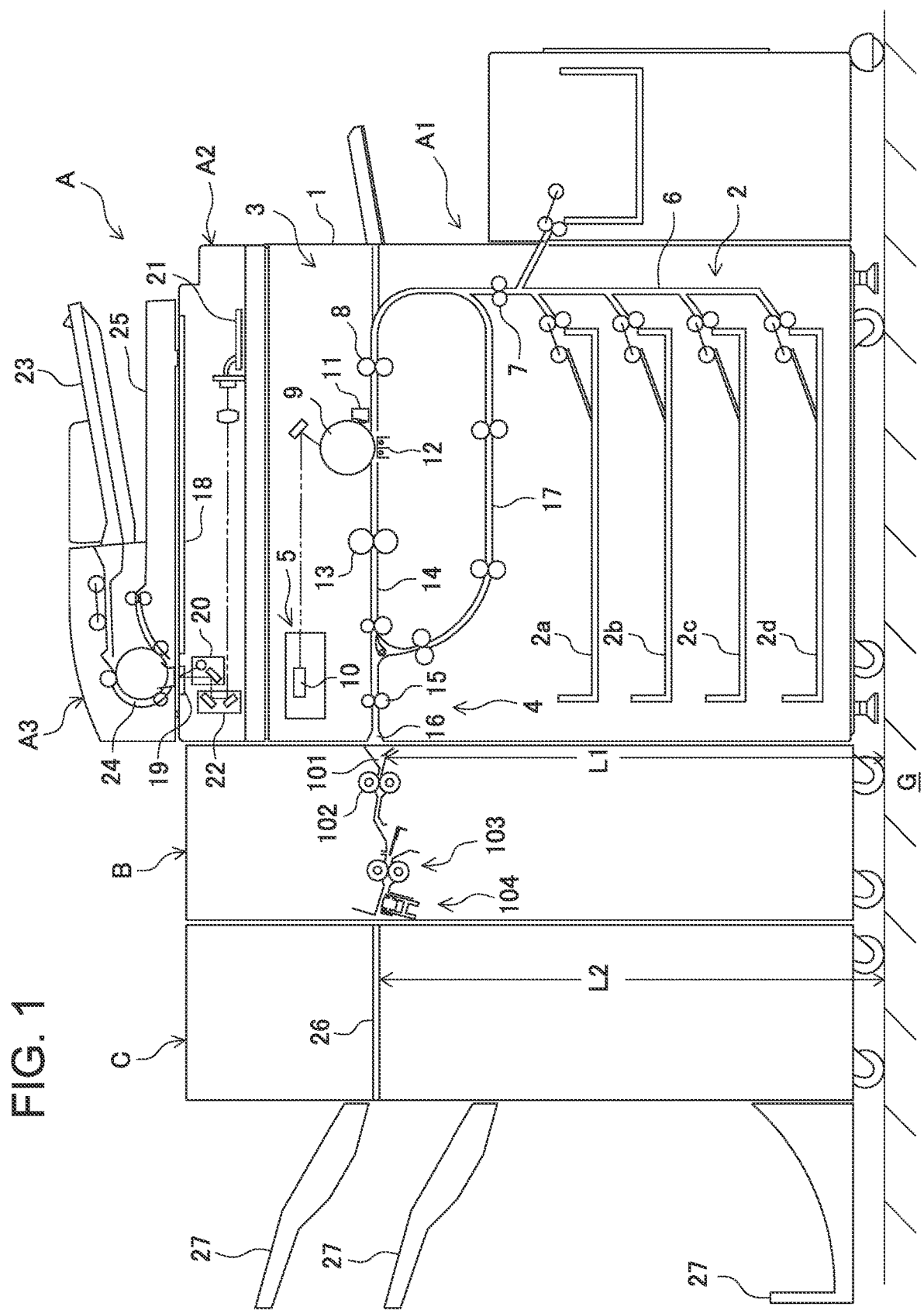
FIG. 1 is an overall configuration view of an image forming system provided with a sheet folding apparatus according to the present invention.

Hereinafter, a preferred embodiment of the present invention will be described with reference to the accompanying drawings. Throughout the accompanying drawings, the same reference numerals are used to designate the same or similar components.

The following first describes, with reference to FIG. 1, the entire configuration of an image forming system provided with a folding apparatus having an additional folding unit which is a sheet pressing device according to the present invention. The image forming system includes an image forming apparatus A, a folding apparatus B, and a post-processing apparatus C. The image forming apparatus A forms an image on a sheet S, the folding apparatus B performs folding processing for the image-formed sheet S, and the post-processing apparatus C provided downstream performs, as needed, staple processing and alignment processing and discharges the resultant sheet S to a storage tray 27 provided further downstream. The image forming system includes devices having various structures, such as a copier, and a printer. Hereinafter, details of the image forming apparatus A, folding apparatus B, and post-processing apparatus C will be described.

[Image Forming Apparatus]

As illustrated in FIG. 1, the image forming apparatus A includes an image forming unit A1, an image reading unit A2, and a document feed unit A3. The image forming unit A1 has, in a unit housing 1, a sheet feed part 2, an image forming part 3, a sheet discharge part 4, and a data processing part 5.

The sheet feed part 2 includes a plurality of cassettes 2a, 2b, 2c, and 2d, which can respectively store sheets S of pre-selected standard sizes different from one another. The cassettes 2a, 2b, 2c, and 2d each incorporate a separating mechanism for separating the sheets S one from another and a sheet feed mechanism for delivering the sheets S. The thus configured sheet feed part 2 delivers a sheet S of a size designated by a main body control part (not illustrated) to a sheet feed path 6. The sheet feed path 6 is provided with a feed roller 7 disposed at the intermediate portion thereof and conveying the sheets S fed from the plurality of cassettes 2a, 2b, 2c, and 2d downstream and a registration roller 8 disposed at the end portion thereof and aligning the front ends of the sheets S. The sheets S whose front ends have been aligned by the registration roller 8 are fed to the image forming part 3 provided downstream at a predetermined timing.

The image forming part 3 may have any image forming mechanism as long as it can form an image on the sheet S fed from the sheet feed part 2. In the illustrated embodiment, an electrostatic image forming mechanism is employed as the image forming part 3. However, the image forming part 3 is not limited to the illustrated electrostatic image forming mechanism, but may be an inkjet image forming mechanism, an offset image forming mechanism, or the like.

The image forming part 3 illustrated in FIG. 1 is provided with a photoreceptor 9 (drum, belt) and a light emitter 10 that emits an optical beam toward the photoreceptor 9, and a developer 11 and a cleaner (not illustrated) are disposed around the rotating photoreceptor 9. The illustrated print mechanism is a monochrome print mechanism, where a latent image is optically formed on the photoreceptor 9 by an optical beam from the light emitter 10, and toner ink is attached to the formed latent image using the developer 11. The ink image (ink toner) attached to the photoreceptor 9 is image-transferred onto the sheet S fed from the sheet feed part 2 by a transfer charger 12. The resultant sheet S is image-fixed by a fixing roller 13 and then fed to a discharge path 14. The image forming part 3 is further provided a circulation path 17. The sheet S fed to the circulation path 17 from the discharge path 14 is turned over in a switchback path and fed again to the registration roller 8, followed by image formation on the back surface of the sheet S, and the resultant sheet S is fed to the discharge path 14. The discharge path 14 is provided with a discharge roller 15 and is further provided with a discharge port 16 at the end of the discharge path 14. The sheet S conveyed by the discharge roller 15 is fed to the folding apparatus B through the discharge port 16.

The image reading unit A2 is provided above the thus configured image forming unit A1. The image reading unit A2 optically reads a document image formed by the image forming part 3. Further, the document feed unit A3 is provided above the image reading unit A2.

The image reading unit A2 has first and second platens 18 and 19 made of transparent glass, a reading carriage 20, a light source mounted on the reading carriage 20, a photoelectric conversion element 21, and a reduction optical system 22 constituted by combining mirrors and lenses. The reading carriage 20 is driven to move along the first platen 18 with an image on a document sheet S placed on the first platen 18 irradiated with light from the light source, and reflected light from the image on the document sheet S is guided to the photoelectric conversion element 21 by the reduction optical system 22, whereby the image on the document sheet S is read. The photoelectric conversion element 21 converts the obtained image data into an electric signal and transfers the electric signal to the image forming part 3.

The document feed unit A3 has a feed tray 23, a feed path 24, and a discharge tray 25. Document sheets placed on the feed tray 23 are fed one by one along the feed path 24. The document sheet fed along the feed path 24 passes on the platen 19 and is discharged to the discharge tray 25. When the document sheet traveling from the document feed unit A3 and passing on the second platen 19 is read, the reading carriage 20 is previously stopped below the second platen 19 and is made to read an image on the document sheet passing on the second platen 19 at that position.

[Post-Processing Apparatus]

The post-processing apparatus C is connected downstream from the folding apparatus B connected to the image forming apparatus A. The post-processing apparatus C receives a sheet S that has been subjected to folding processing by the folding apparatus B or a sheet S that has not been discharged without being subjected to folding processing and performs staple processing, alignment processing, and the like as needed.

A post-processing path 26 is provided inside the post-processing apparatus C, and post-processing devices such as a staple unit and an alignment unit are disposed along the post-processing path 26. The post-processing apparatus C receives the sheet S discharged from the image forming apparatus A through the folding apparatus B and uses the post-processing devices such as the staple unit and alignment unit to perform staple processing and alignment processing for the received sheet S and discharges the resultant sheet S to the storage tray 27.

[Folding Apparatus]

The folding apparatus B connected to the image forming apparatus A receives the image-formed sheet S discharged from the discharge port 16 of the image forming apparatus A and performs folding processing for the received sheet S.

Figure 2:
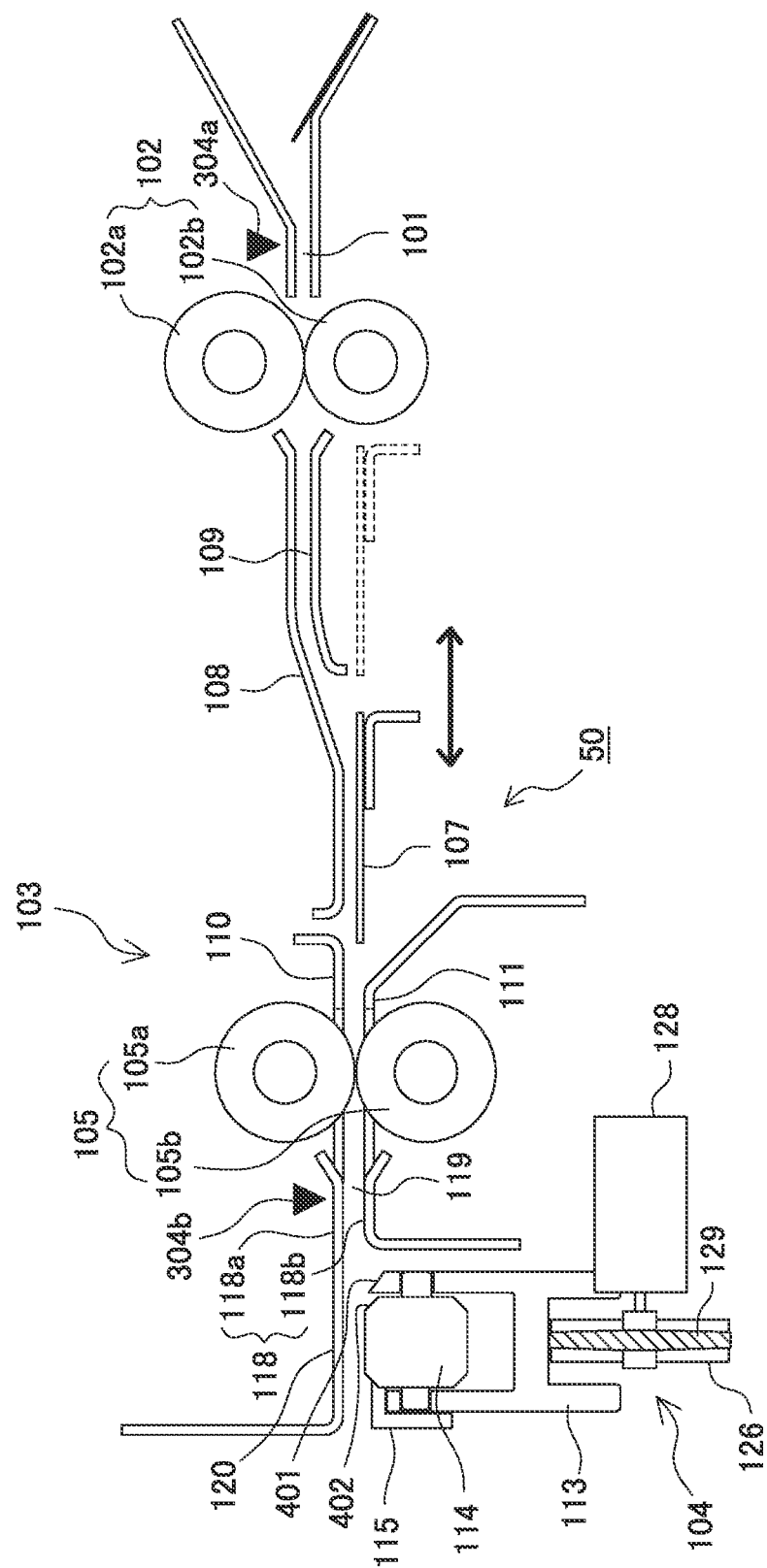
FIG. 2 is an explanatory view illustrating the main part of a folding mechanism and an additional folding unit (corresponding to a sheet pressing device) of a folding apparatus illustrated in FIG. 1.

FIG. 2 illustrates the internal configuration of the folding apparatus B. The folding apparatus B has, inside thereof, a conveying path 101 for conveying a sheet. The conveying path 101 is provided with one or a plurality of conveying roller pairs 102 and a folding mechanism 103 which is provided downstream from the conveying roller pair or pairs 102. Further, an additional folding unit 104 is provided in the folding mechanism 103 at the downstream end of the conveying path 101. The folding apparatus B uses the folding mechanism 103 and additional folding unit 104 to sequentially perform folding processing and additional folding processing for the sheet S conveyed along the conveying path 101 and passes the resultant sheet S to the post-processing apparatus C.

As illustrated in FIG. 1, the conveying path 101 is disposed so as to be connected to the discharge port 16 of the image forming apparatus A, allowing the sheet S discharged from the discharge port 16 to be carried in the folding apparatus B through the conveying path 101. Further, a discharge port of the additional folding unit 104 is disposed so as to be connected to the post-processing path 26 of the post-processing apparatus C, allowing the sheet S discharged from the additional folding unit 104 to be carried in the post-processing apparatus C through the post-processing path 26.

The conveying roller pair 102, which is a rubber roller pair, includes an upper conveying roller 102a disposed on the upper side and a lower conveying roller 102b disposed on the lower side so as to face the upper conveying roller 102a. In the present embodiment, the upper conveying roller 102a is connected to a not-shown conveying roller drive motor and rotates with rotation of the conveying roller drive motor. The lower conveying roller 102b is brought into pressure contact with the upper conveying roller 102a by the biasing force of a not-shown spring and rotates following the rotation of the upper conveying roller 102a. However, the conveying roller pair 102 is not limited to the above configuration as long as it can convey the sheet S, and may have any appropriate configuration.

The folding mechanism 103 is composed of a folding roller pair 105 and an abutting plate 107. The folding roller pair 105, which is a rubber roller pair, includes an upper folding roller 105a disposed on the upper side and a lower folding roller 105b disposed on the lower side so as to face the upper folding roller 105a. The lower folding roller 105b is brought into pressure contact with the upper folding roller 105a by the biasing force of a not-shown spring. The upper folding roller 105a and the lower folding roller 105b are connected to a not-shown common folding roller drive motor and rotate in opposite directions to each other with rotation of the folding roller drive motor. The abutting plate 107 is disposed between the conveying roller pair 102 and the folding roller pair 105. The abutting plate 107 is connected to a not-shown abutting plate drive motor and moves in parallel to the conveying path 101 on the upstream side relative to the folding roller pair 105 with driving of the abutting plate drive motor.

The conveying path 101 is provided with an upper conveying guide 108, a lower conveying guide 109, an upper folding guide 110, and a lower folding guide 111 in a part thereof between the conveying roller pair 102 and the folding roller pair 105.

The upper conveying guide 108 is formed to extend from a part immediately downstream from the conveying roller pair 102 to a part above the abutting plate 107 so as to guide the front end of the sheet S from the conveying roller pair 102 to the abutting plate 107. The upper conveying guide 108, which is configured to regulate the flow of the sheet S conveyed along the conveying path 101, is disposed above the conveying path 101 and has a shape curving downward toward the downstream side. The upper folding guide 110 is disposed between the upper conveying guide 108 and the folding roller pair 105 and extends to a part immediately upstream from the folding roller pair 105 so as to guide the front end of the sheet S and a folded part (to be described later) of the sheet S to the folding roller pair 105. The upper folding guide 110, which is configured to regulate the flow of the sheet S in the folding mechanism 103, is provided downstream from the upper conveying guide 108 and above the conveying path 101.

The lower conveying guide 109, which is configured to regulate the flow of the sheet S conveyed along the conveying path 101, is disposed below the conveying path 101 and has a shape curving downward toward the downstream side like the upper conveying guide 108. The lower conveying guide 109 ends in front of the abutting plate 107 to form an open space downstream thereof. The lower folding guide 111 is disposed downstream from the abutting plate 107 and extends across the upstream and downstream sides of the folding roller pair 105. A part of the lower folding guide 111 that is upstream relative to the folding roller pair 105 has a surface for guiding the front end of the conveyed sheet S and a folded part (to be described later) of the sheet S to a nip portion of the folding roller pair 105 and a slope for easily guiding them to the above surface.

The abutting plate 107 is moved by a not-shown abutting plate drive device and a not-shown control part. The abutting plate 107 is configured so as to fill a space between the lower conveying guide 109 and the lower folding guide 111 when the sheet S conveyed by the conveying roller pair 102 travels to the folding roller pair 105 along the conveying path 101 and guides the front end of the conveyed sheet S to the lower folding guide 111. When the control part recognizes that the front end of the sheet S is nipped by the folding roller pair 105, it moves the abutting plate 107 to a retreating position immediately below the lower conveying guide 109 to form a space 50 for forming a loop between the lower conveying guide 109 and the lower folding guide 111 so as to form a folded part. After formation of the space 50 for forming a loop, when the sheet S is conveyed by a predetermined amount with the front end thereof nipped by the folding roller pair 105, the intermediate portion of the sheet S is bent downward in the space 50 for forming a loop to form a loop part. In this state, the abutting plate 107 is moved toward the folding roller pair 105 from the retreating position to form the folded part. Then, after the abutting plate 107 arrives in front of the folding roller pair 105, the folding roller pair 105 is driven to convey the sheet S to thereby form a first fold 132. Further, after the abutting plate 107 is moved to the retreating position, the folding roller pair 105 is driven to convey the sheet S to nip the loop part to thereby form a second fold 133. As a result, the sheet S that has been Z-folded is conveyed downstream. The details of the loop formation are disclosed in JP 2002-68583A and the like and will not be described in detail here.

Figure 3:
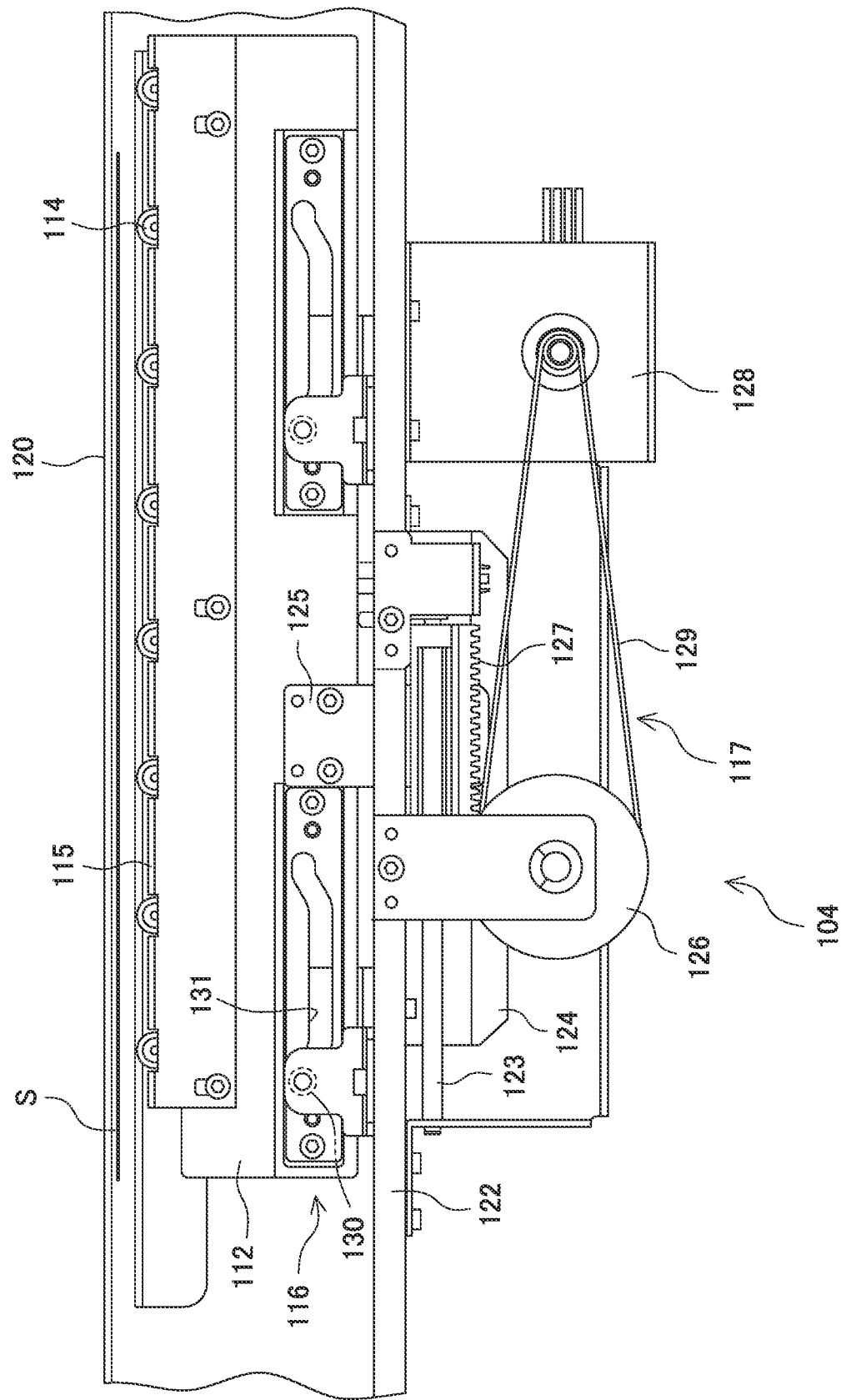
FIG. 3 is a view of the additional folding unit of the folding apparatus illustrated in FIG. 1 as viewed from a discharge port side.

The following describes the configuration of the additional folding unit 104 with reference to FIG. 3. The additional folding unit 104 is disposed downstream from the folding roller pair 105 in a sheet conveying direction and below (on the side of the lower folding roller 105b) an additional folding receiving member 120. The additional folding unit 104 has a movable support member 112, a plurality of additional folding rollers 114 supported by the support member 112, a regulating member 115 attached to the support member 112, a first moving mechanism 116 that moves the support member 112 in a direction approaching or separating from the additional folding receiving member 120, and a second moving mechanism 117 that horizontally moves the support member 112 along the fold of the sheet S. A pair of receiving guides 118 for guiding the sheet S to the additional folding unit 104 are provided downstream from the folding roller pair 105, and the upstream end of the pair of receiving guides 118 forms a receiving port 119 for receiving the sheet S to be fed to the additional folding unit 104. An upper receiving guide 118a is formed of the same material as that of the additional folding receiving member 120, and the upper receiving guide 118a and additional folding receiving member 120 function as a guide continuing in the sheet conveying direction. A lower receiving guide 118b guides the sheet S from the receiving port 119 to the additional folding rollers 114 together with the upper receiving guide 118a. The plurality of additional folding rollers 114 supported by the above-mentioned support member 112 and the additional folding receiving member 120 constitute an additional folding part.

The plurality of additional folding rollers 114, which are supported by the support member 112, are arranged in a row in a pressing member arrangement area to be equally spaced from one another along the fold of the sheet S so as to each rotate about a rotation axis extending in the conveying direction (direction parallel to the additional folding receiving member 120 and perpendicular to the fold of the sheet S) of the sheet S. The first moving mechanism 116 moves the support member 112 that supports the plurality of additional folding rollers 114 in a direction approaching or separating from the additional folding receiving member 120. This allows the plurality of additional folding rollers 114 to approach and separate from the additional folding receiving member 120, thus allowing the plurality of additional folding rollers 114 to move between a pressing position and a retreating position. The pressing position is a position at which the fold of the sheet S disposed between the additional folding rollers 114 and the additional folding receiving member 120 is pressed by the additional folding rollers 114 and additional folding receiving member 120. The retreating position is a position obtained by moving the additional folding rollers 114 from the pressing position in a direction separating from the sheet S. The second moving mechanism 117 horizontally (left-right direction in FIG. 3) moves the support member 112 at the pressing position to move the additional folding rollers 114 along the fold of the sheet S. The additional folding rollers 114 and additional folding receiving member 120 are configured to directly contact each other at the pressing position when the sheet S is not interposed therebetween. The length of the pressing member arrangement area, that is, the distance between two additional folding rollers 114 disposed at opposite ends of the pressing member arrangement area is set such that, at the pressing position, one end portion (end portion on the upstream side in the moving direction of the additional folding rollers 114) of the fold of the sheet S is disposed between the two adjacent additional folding rollers 114 disposed at "one side" of the pressing member arrangement area, and the additional folding roller 114 disposed at the end of the "other side" of the pressing member arrangement area is disposed on the fold. The "one side" of the pressing member arrangement area refers to a part of the pressing member arrangement area from the center to the end in the arrangement direction of the additional folding rollers 114, and the "other side" refers to a part of the pressing member arrangement area opposed to the "one side". More preferably, the length of the pressing member arrangement area is set such that, at the pressing position, one end portion of the fold of the sheet S is disposed between the two adjacent additional folding rollers 114 disposed at the end of the "one side" of the pressing member arrangement area, and the additional folding roller 114 disposed at the end of the "other side" of the pressing member arrangement area is disposed on the fold. Preferably, as in the illustrated embodiment, the length of the pressing member arrangement area, that is, the length between two additional folding rollers 114 disposed at both ends of the pressing member arrangement area is smaller than the length of the fold of the sheet S received by the additional folding unit 104 by one pitch (one interval between the two adjacent additional folding rollers) of the arrangement of the additional folding rollers 114. In this case, the number of required additional folding rollers 114 can be reduced to reduce cost involved in the additional folding rollers 114. Further, since the number of the additional folding rollers 114 supported by the support member 112 is reduced, pressing force per additional folding roller 114 against the sheet S when the same force is applied to the support member 112 increases to increase the effect of additional folding. That is, it is possible to achieve efficient additional folding with a smaller force.

The additional folding unit 104 receives the sheet S therein in a state where the additional folding rollers 114 are located at the retreating position from the additional folding receiving member 120 or a receiving position separated from the additional folding receiving member 120 more away than the pressing position is. Thereafter, a sheet position detection unit (not illustrated) provided downstream from the folding roller pair 105 is used to detect the position of the sheet S and, when it is determined that the fold of the sheet S reaches above the additional folding rollers 114, the sheet S is stopped, and the first moving mechanism 116 is used to move the additional folding rollers 114 toward the additional folding receiving member 120, i.e., the pressing position. The sheet S is carried in the additional folding unit 104 such that, when the additional folding rollers 114 are moved to the pressing position, one end portion (end portion on the upstream side in the moving direction along the fold) of the fold is disposed between the two adjacent additional folding rollers 114 disposed at the end of the "one side" of the pressing member arrangement area and that the other end portion (end portion on the downstream side in the moving direction along the fold) of the fold is disposed outside (i.e., outside of the additional folding roller 114 disposed at the end of the "other side" of the pressing member arrangement area) the pressing member arrangement area. Further, the second moving mechanism 117 is used to move, relative to the additional folding receiving member 120, the additional folding rollers 114 located at the pressing position along the fold of the sheet S to additionally fold the entire fold of the sheet S with the additional folding rollers 114, thereby strengthening the fold. As described above, the additional folding rollers 114 and additional folding receiving member 120 function together as a pressing member.

Further, the regulating member 115 having a substantially L-shaped cross section and attached to the support member 112 is disposed outside the additional folding rollers 114 disposed at opposite ends and between the adjacent additional folding rollers 114 disposed spaced from each other. During the additional folding in which the additional folding rollers 114 are moved along the fold of the sheet S at the pressing position relative to the additional folding receiving member 120, the regulating member 115 is disposed at a regulating position at which a distance d1 between the upper surface (i.e., the surface facing the additional folding receiving member 120) of the regulating member 115 and the lower surface of the additional folding receiving member 120 is smaller than a normal vertical dimension of the conveying path, for example, a distance d2 between the pair of receiving guides 118 (upper receiving guide 118a and lower receiving guide 118b) constituting the receiving path continuing from the receiving port 119 of the additional folding unit 104 and is moved along the fold of the sheet S together with the support member 112 while keeping the distance d1. The distance d1 between the upper surface of the regulating member 115 and the lower surface of the additional folding receiving member 120 is set so as to prevent the above members from directly contacting each other. With this configuration, prior to the pressing by the additional folding rollers 114, the regulating member 115 makes the height of the folded part smaller than the distance between the upper receiving guide 118a and the lower receiving guide 118b. In this state, additional folding (pressing against the fold of the sheet S) can be achieved by the additional folding rollers 114.

A gap between the additional folding rollers 114 and the additional folding receiving member 120, and a gap between the regulating member 115 and the additional folding receiving member 120 are each maintained constant over the entire area thereof in the direction along the fold of the sheet S.

Figure 4:
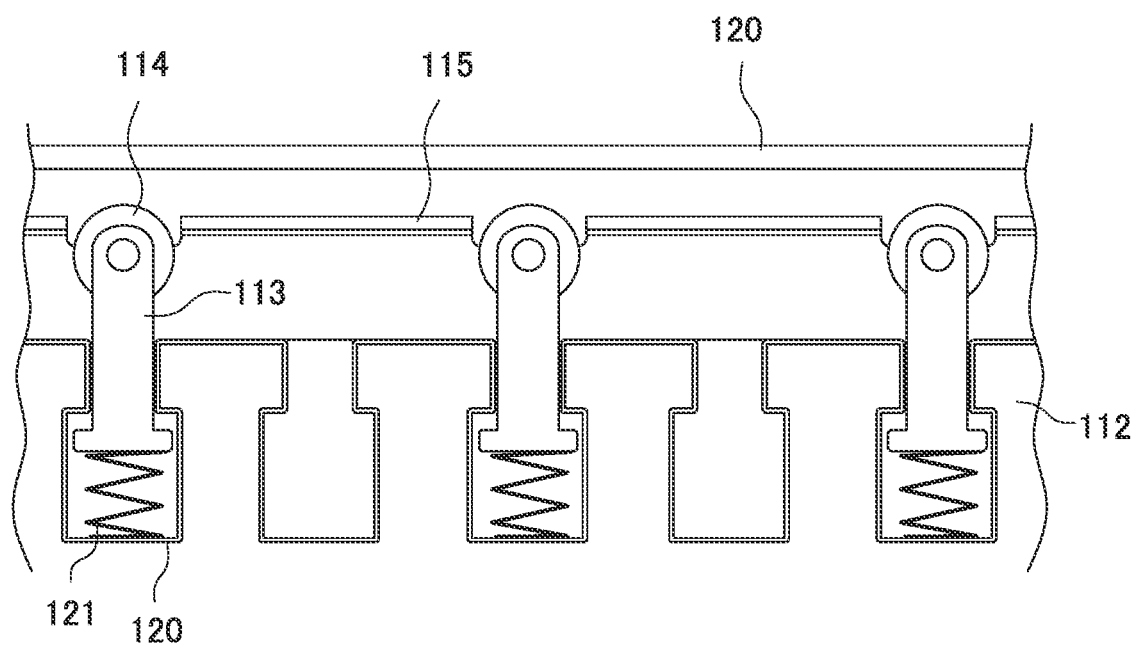
FIG. 4 is an explanatory view schematically illustrating a mechanism provided inside the additional folding unit illustrated in FIG. 3 and configured to bias additional folding rollers to a sheet.

As illustrated in FIG. 4, it is preferable that the additional folding rollers 114 are each rotatably attached to an auxiliary member 113 movably supported with respect to the support member 112 and that a spring 121 is disposed between a spring receiving part 120 formed in the support member 112 and the lower end portion of the auxiliary member 113 so as to bias each of the additional folding rollers 114 toward the additional folding receiving member 120. Thus, when the support member 112 of the additional folding unit 104 and the regulating member 115 attached thereto are moved upward toward the additional folding receiving member 120, the additional folding rollers 114 stop their upward movement when contacting the additional folding receiving member 120 through the sheet S. On the other hand, the support member 112 and regulating member 115 can continue moving upward by the contraction of the spring 121 and can be stopped at the time point when the distance between the bottom surface of the regulating member 115 and the lower surface of the additional folding receiving member 120 becomes a desired value to make the regulating member 115 reach the regulating position. Further, each auxiliary member 113 is biased by each individual spring 121, so that even when the support member 112 is moved slightly inclined along the fold of the sheet S, the additional folding rollers 114 can apply constant pressing force to the fold of the sheet S, preventing uneven additional folding due to a difference in pressure across the fold.

The following describes the detailed configurations of the first moving mechanism 116 and second moving mechanism 117 in the illustrated embodiment.

The support member 112 of the additional folding unit 104 is vertically movably attached, through a bracket 125, to a slider 124 movable along a guide rail 123 fixed to a casing 122 or the like of the folding apparatus B and is configured to be horizontally moved in conjunction with the slider 124. A rack 127 meshed with a pinion (not illustrated) rotated integrally with a pulley 126 is provided on the slider 124. When an additional folding drive motor 128 provided upstream relative to the pulley 126 in the conveying direction and below the lower folding roller 105*b* is driven, the rotation of the motor 128 is transmitted to the pulley 126 through a belt 129 to rotate the pulley 126, whereby the slider 124 can be moved horizontally along the guide rail 123.

Further, a cam groove 131 engaged with a contact piece 130 fixed to the casing 122 or the like of the folding apparatus B is formed in the support member 112. With the horizontal movement of the support member 112, the cam groove 131 is moved while being engaged with the contact piece 130, and the support member 112 is moved while being guided following the shape of the cam groove 131. The cam groove 131 includes a first top horizontal part extending substantially horizontally, a first slope part extending from the end of the first top horizontal part while being inclined downward, a bottom horizontal part extending substantially horizontally from the end of the first slope part, a second slope part extending from the end of the bottom horizontal part while being inclined upward, and a second top horizontal part extending substantially horizontally from the end of the second slope part. When the support member 112 is moved horizontally in FIG. 3 relative to the casing 122 by the slider 124 with the first and second slope parts of the cam groove 131 engaged with the contact piece 130, the support member 112 is moved in a direction approaching or separating from the additional folding receiving member 120, i.e., in the vertical direction in FIG. 3. As described above, the guide rail 123, slider 124, bracket 125, pulley 126, rack 127, additional folding drive motor 128, belt 129, contact piece 130, first and second slope parts of the cam groove 131 constitute the first moving mechanism 116. Further, when the support member 112 is moved horizontally in FIG. 3 relative to the casing 122 by the slider 124 with the top horizontal part of the cam groove 131 engaged with the contact piece 130, the support member 112 and the additional folding rollers 114 supported thereby are moved horizontally in FIG. 3 relative to the additional folding receiving member 120 along the fold of the sheet S. As described above, the guide rail 123, slider 124, bracket 125, pulley 126, rack 127, additional folding drive motor 128, belt 129, contact piece 130, and the bottom horizontal part of the cam groove 131 constitute the second moving mechanism 117. Although, in the illustrated embodiment, the contact piece 130 is fixed to the casing 122 or the like, and the cam groove 131 is formed in the support member 112, it is needless to say that the contact piece 130 may be fixed to the support member 112, and the cam groove 131 may be formed in the casing 122.

When the additional folding rollers 114 are arranged so as to be equally spaced from one another as in the illustrated embodiment, it is necessary to move the additional folding rollers 114 along the fold relative to the additional folding receiving member 120 at the pressing position by a distance equal to or larger than the interval (i.e., distance corresponding to one pitch) between the two adjacent additional folding rollers 114 in order to press completely the fold positioned between the two adjacent additional folding rollers 114 by the additional folding rollers 114 and additional folding receiving member 120. In the configuration of the above-described first moving mechanism 116, the slider 124 is moved horizontally with the contact piece 130 and the first slope part of the cam groove 131 engaged with each other to cause the additional folding rollers 114 supported by the support member 112 to approach the additional folding receiving member 120 and then to reach the pressing position. In the above configuration of the second moving mechanism 117, the slider 124 is moved horizontally with the contact piece 130 and the bottom horizontal part of the cam groove 131 engaged with each other to move the additional folding rollers 114 supported by the support member 112 along the fold at the pressing position. Thus, the length of the bottom horizontal part of the cam groove 131 in the horizontal direction (direction along the fold) is equal to or larger than one pitch between the two adjacent additional folding rollers 114.

The following describes in detail the operation of the additional folding unit 104 according to the illustrated embodiment with reference to FIGS. 5A to 5D, 6A to 6D, 7A to 7D, and 8A to 8D. In the following description, it is assumed that the sheet S that has been Z-folded by the folding mechanism 103 to have first and second folds 132 and 133 is carried in the additional folding unit 104.

Figure 5A:
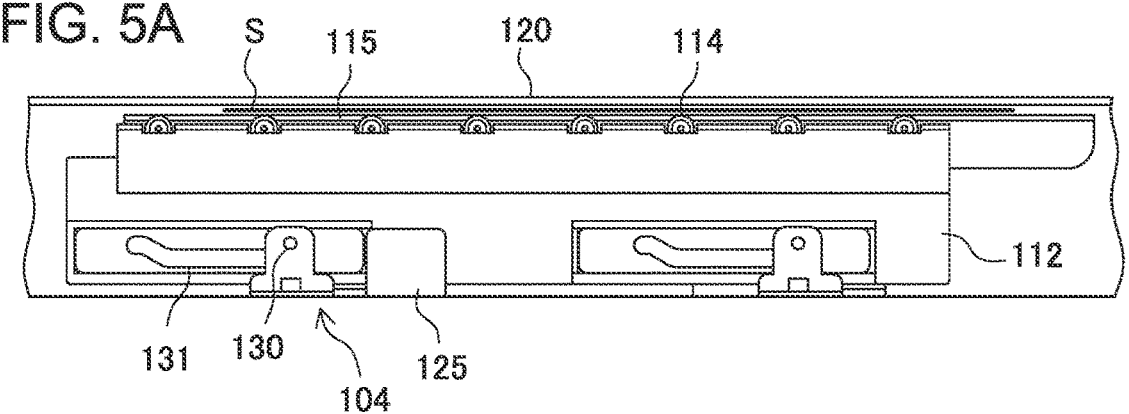

When the sheet S from the folding mechanism 103 is carried in the additional folding unit 104 through the receiving port 119 and a carry-in path constituted by the upper receiving guide 118*a* and lower receiving guide 118*b*, the additional folding rollers 114 supported by the support member 112 are located at the receiving position (home position), as illustrated in FIGS. 5A and 7A. At this time, the lower end portions of the respective additional folding rollers 114 supported by the support member 112 regulate the lower side of the carry-in path, and the additional folding receiving member 120 regulates the upper side of the carry-in path, to thereby guide the first fold 132 of the received sheet S between the additional folding rollers 114 and the additional folding receiving member 120. Further, at this time, the contact piece 130 is positioned at the end portion of the first top horizontal part of the cam groove 131. In the illustrated embodiment, a second retreating position to be described later corresponds to the receiving position. However, the receiving position may be set to any position different from the second retreating position as long as it is positioned closer to the retreating position (first retreating position or second retreating position) than to the pressing position, and the additional folding rollers 114 and the additional folding receiving member 120 are separated from each other.

Figure 5B:
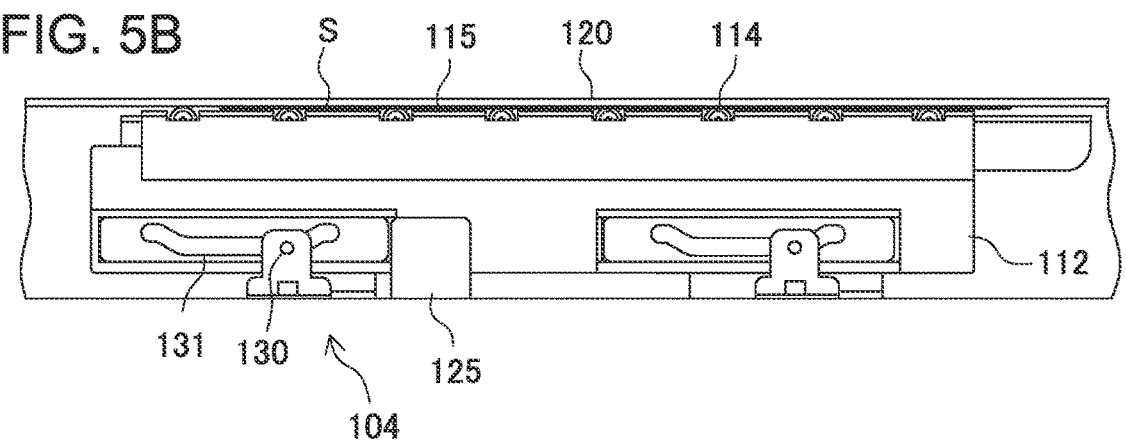

A sheet position detection means (not illustrated) provided downstream relative to the folding roller pair 105 is used to detect the position of the sheet S, and when it is recognized that the first fold 132 on the front end side in the carry-in direction of the sheet S carried in the receiving port 119 from the folding roller pair 105 reaches a position above the additional folding rollers 114 as illustrated in FIG. 7A, the conveyance of the sheet S is stopped, and the additional folding drive motor 128 is driven to horizontally move the support member 112 together with the slider 124 through the pinion integrally rotated with the pulley 126 and the rack 127. As a result, the engaged portion between the contact piece 130 and the cam groove 131 is moved from the first top horizontal part to the first slope part and, accordingly, the support member 112 is moved upward toward the additional folding receiving member 120. Thus, as illustrated in FIGS. 5B and 7B, the additional folding rollers 114 supported by the support member 112 are moved to the pressing position at which the first fold 132 of the sheet S is sandwiched and pressed between the additional folding rollers 114 and additional folding receiving member 120. At this time, one end portion (end portion on the upstream side in the moving direction of the additional folding rollers 114 in the forward traveling) of the first fold 132 of the sheet S is disposed between the two adjacent additional folding rollers 114 disposed at the "one side", and the additional folding roller 114 disposed at the end of the "other side" is positioned below the first fold 132 of the sheet S, with the result that the other end portion (end portion on the downstream side in the moving direction of the additional folding rollers 114 in the forward traveling) of the first fold 132 of sheet S is disposed outside the pressing member arrangement area (see FIG. 5B). In the state illustrated in FIGS. 5B and 7B, one end portion of the first fold 132 of the sheet S is disposed at the intermediate position between the two adjacent additional folding rollers 114 disposed at the end position; however, the above phrase "between the two adjacent additional folding rollers 114 disposed at the end position" includes a position at which the pressing point of the additional folding roller 114 disposed at the end position coincides with one end portion of the first fold 132 of the sheet S. The auxiliary member 113 to which each additional folding roller 114 is attached is biased toward the additional folding receiving member 120 by the spring 121, so that even after the support member 112 is moved upward to make the additional folding rollers 114 abut against the additional folding receiving member 120 through the sheet S, the support member 112 can be moved further upward. Accordingly, the regulating member 115 is also moved further upward to press the first fold 132 of the sheet S positioned above the additional folding rollers 114, thereby regulating the thickness of the first fold 132 of the sheet S to a predetermined thickness or less. The "carry-in direction" in the present specification refers to a direction in which the sheet S from the folding roller pair 105 is carried in the additional folding unit 104 through the receiving port 119.

Figure 5C:
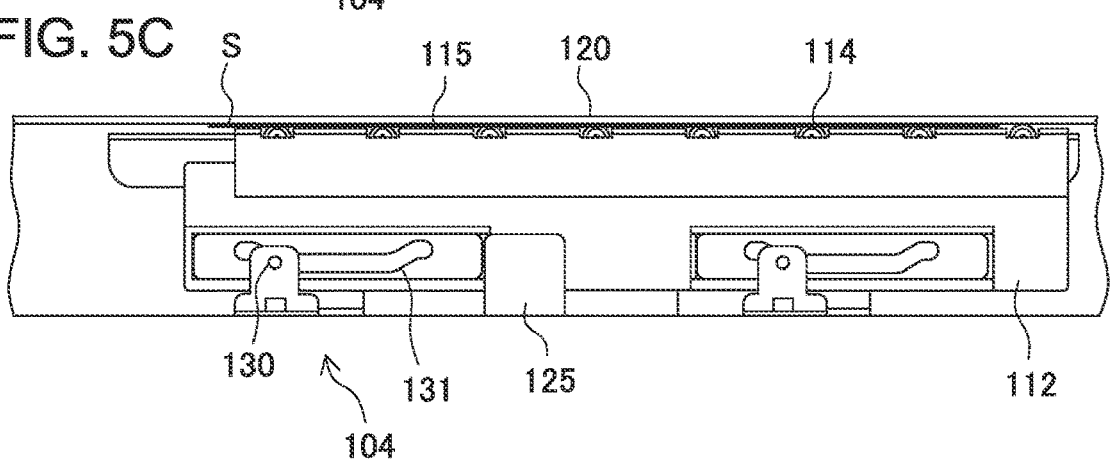

When the additional folding drive motor 128 is driven in the state illustrated in FIGS. 5B and 7B to further horizontally move the support member 112 together with the slider 124, the engaged portion between the contact piece 130 and the cam groove 131 is moved from the first slope part to the bottom horizontal part, as illustrated in FIGS. 5C and 7C. Then, the regulating member 115 attached to the support member 112 regulates the thickness of the first fold 132 of the sheet S to a predetermined thickness (corresponding to the distance d1) or less. At the same time, the additional folding rollers 114 supported by the support member 112 are moved at the pressing position along the first fold 132 relative to the additional folding receiving member 120 by a distance equal to or larger than one pitch of the additional folding rollers 114, and the leading additional folding roller 114 in the moving direction thereof is moved to a position beyond the other end portion (end portion on the downstream side in the moving direction of the additional folding rollers 114 in the forward traveling) of the first fold 132 of the sheet S. In more detail, the other end portion of the first fold 132 of the sheet S is disposed between the two adjacent additional folding rollers 114 disposed at the end of the "other side", and the additional folding roller 114 disposed at the end of the "one side" is positioned below the first fold 132 of the sheet S, with the result that one end portion (end portion on the upstream side in the moving direction of the additional folding rollers 114 in the forward traveling) of the first fold 132 of sheet S is disposed outside the pressing member arrangement area (see FIG. 5C). In the state illustrated in FIGS. 5C and 7C, the other end portion of the first fold 132 of the sheet S is disposed at the intermediate position between the two adjacent additional folding rollers 114 disposed at the end position; however, the above situation "between the two adjacent additional folding rollers 114 disposed at the end position" includes a position at which the pressing point of the additional folding roller 114 disposed at the end position coincides with the other end portion of the first fold 132 of the sheet S. In this manner, the first fold 132 is pressed over the entire area thereof by the additional folding rollers 114 and additional folding receiving member 120, whereby strengthening, i.e., additional folding of the first fold 132 is achieved.

Figure 5D:
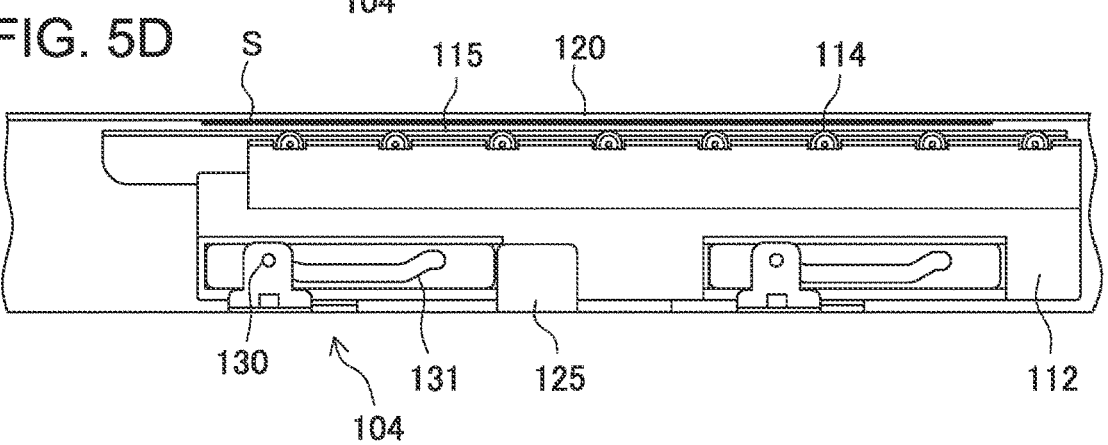

When the additional folding drive motor 128 is driven in the state illustrated in FIGS. 5C and 7C to further horizontally move the support member 112 together with the slider 124, the engaged portion between the contact piece 130 and the cam groove 131 is moved from the bottom horizontal part to the second top horizontal part through the second slope part. Thus, as illustrated in FIGS. 5D and 7D, the support member 112 is moved downward together with the regulating member 115 in a direction separating from the additional folding receiving member 120 to reach the first retreating position below and near a position at which the additional folding rollers 114 supported by the support member 112 end their pressing operation, whereby the first additional folding processing is completed. The first retreating position differs from the receiving position (home position).

When the operation state becomes that illustrated in FIGS. 5D and 7D upon completion of the first additional folding processing, it becomes possible for the sheet S to be conveyed by the conveying roller pair 102 and folding roller pair 105 which are positioned on the upstream side in the carry-in direction. Then, in the state illustrated in FIGS. 5D and 7D, the sheet S is conveyed by the conveying roller pair 102 and folding roller pair 105, and the position of the sheet S is detected by the sheet position detection means provided upstream relative to the folding roller pair 105. Then, as illustrated in FIG. 8A, when it is recognized that the second fold 133 positioned on the rear end side in the carry-in direction relative to the first fold 132 reaches above the additional folding rollers 114, the conveyance of the sheet S is stopped.

Figure 6A:
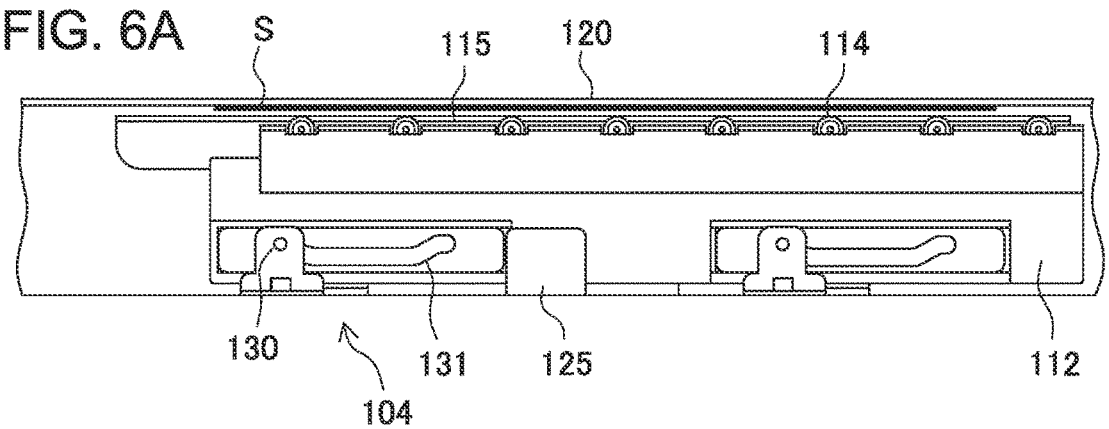
Figure 6B:
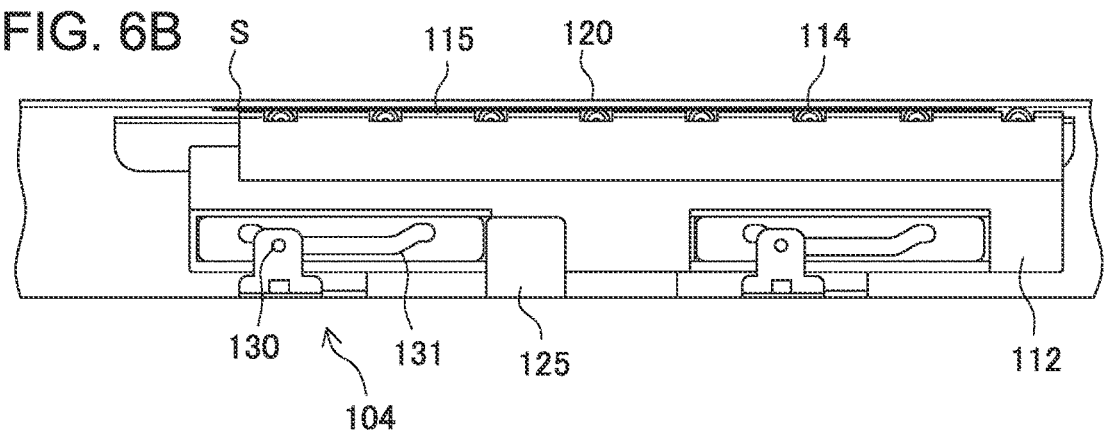
Figure 8A:
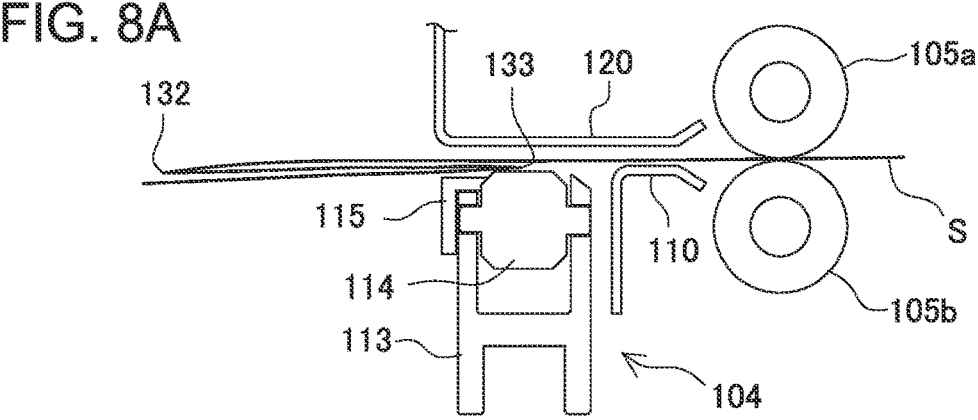
FIGS. 8A to 8D are explanatory views illustrating the operation of the additional folding part when additional folding processing is performed for the sheet in the additional folding unit, which are side views corresponding to FIGS. 6A to 6D, respectively.
Figure 8B:
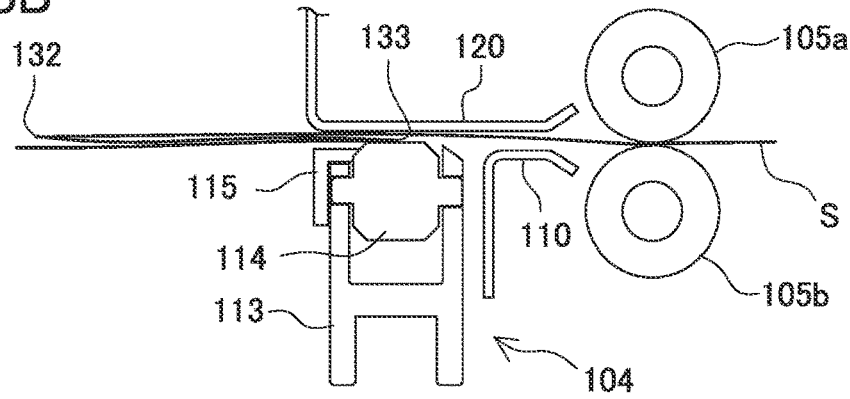

When the motion of the sheet S with the second fold 133 is stopped above the additional folding rollers 114 as illustrated in FIG. 8A, the additional folding drive motor 128 is driven so as to be rotated in the direction opposite to the forward traveling direction, to thereby horizontally move the support member 112 together with the slider 124 through the pinion integrally rotated with the pulley 126 and the rack 127 in the direction opposite to the forward traveling direction. As a result, the engaged portion between the contact piece 130 and the cam groove 131 is moved from the second top horizontal part to the second slope part and, accordingly, the support member 112 is moved upward toward the additional folding receiving member 120. Thus, as illustrated in FIGS. 6B and 8B, the additional folding rollers 114 supported by the support member 112 are moved to the pressing position at which the second fold 133 of the sheet S is sandwiched and pressed between the additional folding rollers 114 and the additional folding receiving member 120. The position of each of the additional folding rollers 114 at this state, i.e., the position of the start point of the backward traveling coincides with the position of the end point of the forward traveling. At this time, one end portion (end portion on the upstream side in the moving direction of the additional folding rollers 114 in the backward traveling) of the second fold 133 of the sheet S is disposed between the two adjacent additional folding rollers 114 disposed at the "one side", and the additional folding roller 114 disposed at the end position of the "other side" is positioned below the second fold 133 of the sheet S, with the result that the other end portion (end portion on the downstream side in the moving direction of the additional folding rollers 114 in the backward traveling) of the second fold 133 of the sheet S is disposed outside the pressing member arrangement area (see FIG. 6B). The auxiliary member 113 to which each additional folding roller 114 is attached is biased toward the additional folding receiving member 120, so that even after the support member 112 is moved upward to make the additional folding rollers 114 abut against the additional folding receiving member 120 through the sheet S, the support member 112 can be moved further upward. Accordingly, the regulating member 115 is also moved further upward to press the sheet section and second fold 133 of the sheet S positioned above the additional folding rollers 114, thereby regulating the thickness of the second fold 133 of the sheet S to a predetermined thickness or less.

Figure 6C:
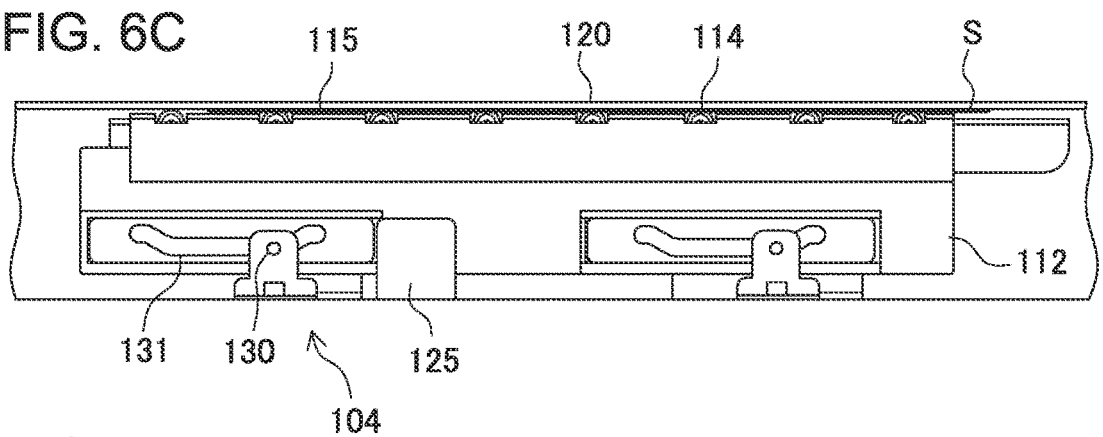
Figure 8C:
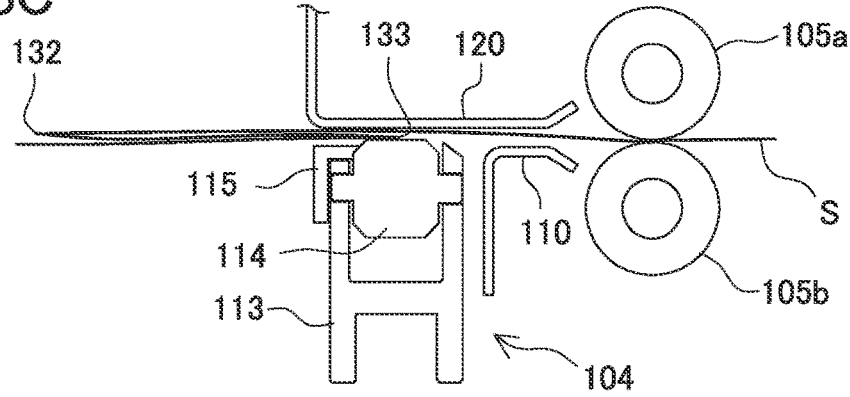

When the additional folding drive motor 128 is driven in the state illustrated in FIGS. 6B and 8B to further horizontally move the support member 112 together with the slider 124 in the direction opposite to the forward traveling direction, the engaged portion between the contact piece 130 and the cam groove 131 is moved from the second slope part to the bottom horizontal part, as illustrated in FIGS. 6C and 8C. Then, the regulating member 115 attached to the support member 112 regulates the thickness of the second fold 133 of the sheet S to a predetermined thickness (corresponding to the distance d1) or less. At the same time, the additional folding rollers 114 supported by the support member 112 are moved at the pressing position along the second fold 133 of the sheet S relative to the additional folding receiving member 120 in the direction opposite to the forward traveling direction by a distance equal to or larger than one pitch of the additional folding rollers 114, and the leading additional folding roller 114 in the moving direction thereof is moved to a position beyond the end portion of the second fold 133 of the sheet S. In this manner, the second fold 133 is pressed over the entire area thereof by the additional folding rollers 114 and additional folding receiving member 120, whereby strengthening (additional folding) of the second fold 133 is achieved.

Figure 6D:
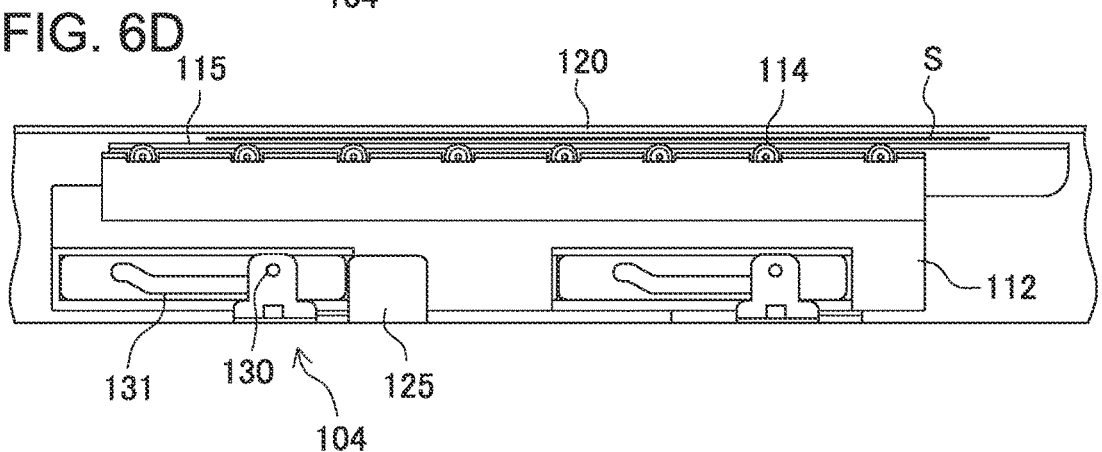
Figure 8D:
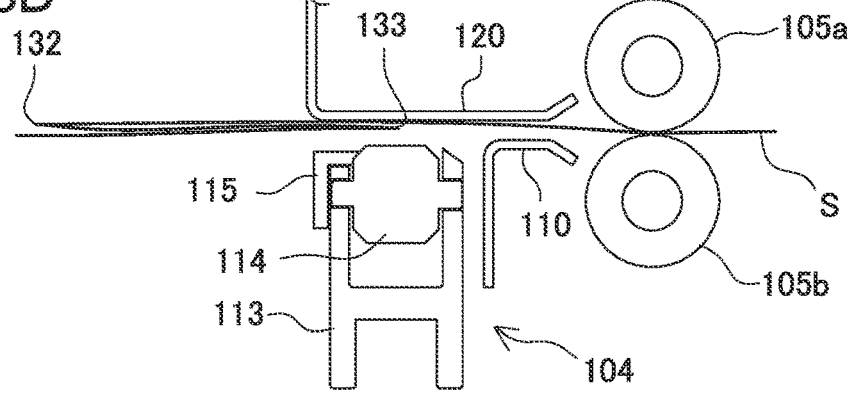

When the additional folding drive motor 128 is driven in the state illustrated in FIGS. 6C and 8C to further horizontally move the support member 112 together with the slider 124 in the direction opposite to the forward traveling direction, the engaged portion between the contact piece 130 and the cam groove 131 is moved from the bottom horizontal part to the first top horizontal part through the first slope part. Thus, as illustrated in FIGS. 6D and 8D, the support member 112 is moved downward together with the regulating member 115 in a direction separating from the additional folding receiving member 120 to reach the second retreating position near a position at which the additional folding rollers 114 supported by the support member 112 end their pressing operation, whereby the second additional folding processing is completed. In the present embodiment, the second retreating position is set at the same position as the receiving position (home position). However, the second retreating position may be set at a position different from the receiving position.

After completion of a series of operations for additional folding, the sheet S is conveyed toward the post-processing apparatus C positioned on the downstream side by the conveying roller pair 102 and folding roller pair 105 which are positioned on the upstream side in the carry-in direction. The lower end portions of the additional folding rollers 114 and the bottom surface of the regulating member 115 at the retreating position function also as a guide for discharging the sheet S that has been subjected to the additional folding.

When the pressing member arrangement area is designed to cover the entire fold of the sheet S, there occurs a necessity of providing a space to the side of the fold of the sheet S on both upstream and downstream sides in the moving direction of the additional folding rollers 114 along the fold. Specifically, on the upstream side, it is necessary to ensure a space to the side of the fold of the sheet S by at least an amount corresponding to the pressing member arrangement area to be positioned outside the fold of the sheet S in the moving direction; on the downstream side, it is necessary to ensure a space to the side of the fold of the sheet S by an amount corresponding to the pressing member arrangement area to be positioned outside the fold of the sheet S in the moving direction and, in addition, a space for allowing movement of the support member 112 at the side of the fold of the sheet by at least an amount corresponding to a moving distance along the fold for pressing. However, in the illustrated additional folding unit 104 of the folding apparatus B, the leading additional folding roller 114 in the moving direction is positioned on the fold of the sheet S at the initial position of the movement along the fold, so that the pressing member arrangement area is not located outside the fold of the sheet S. Thus, the size of the additional folding unit 104 can be reduced due to the absence of the pressing member arrangement area located outside the fold of the sheet S in the moving direction at the initial position of the movement along the fold.

In the additional folding unit 104, when the additional folding rollers 114 are moved relative to the additional folding receiving member 120 by the first moving mechanism 116 from the retreating position or receiving position to the pressing position, one end portion (end portion on the upstream side in the moving direction along the fold) of the fold of the sheet S is positioned between the two adjacent additional folding rollers 114 at the "one side" of the pressing member arrangement area, and the other end portion (end portion on the downstream side in the moving direction along the fold) of the fold is positioned outside (i.e., outside of the additional folding roller 114 positioned at the end position of the "other side" of the pressing member arrangement area) of the pressing member arrangement area. When the additional folding rollers 114 are arranged so as to be equally spaced from one another in the moving direction thereof along the fold, it is necessary to move the additional folding rollers 114 along the fold by a distance equal to or larger than the interval (i.e., distance corresponding to one pitch) between the two adjacent additional folding rollers 114 in order to press completely the fold positioned between the two adjacent additional folding rollers 114 by the additional folding rollers 114 and additional folding receiving member 120. Thus, when the additional folding rollers 114, i.e., support member 112 is moved along the fold by a distance equal to or larger than one pitch of the additional folding rollers 114 that is the minimum distance required for achieving additional folding processing, the additional folding roller 114 at the end position on the upstream side in the moving direction along the fold goes beyond the end portion of the sheet S on the upstream side in the moving direction and is reliably moved to the position of the additional folding roller 114 adjacent to the upstream side thereof at the starting period of the movement, with the result that the end portion of the sheet S positioned, at the starting period, between the two adjacent additional folding rollers 114 at the end position on the upstream side in the moving direction is pressed (additionally folded).

Figure 11:
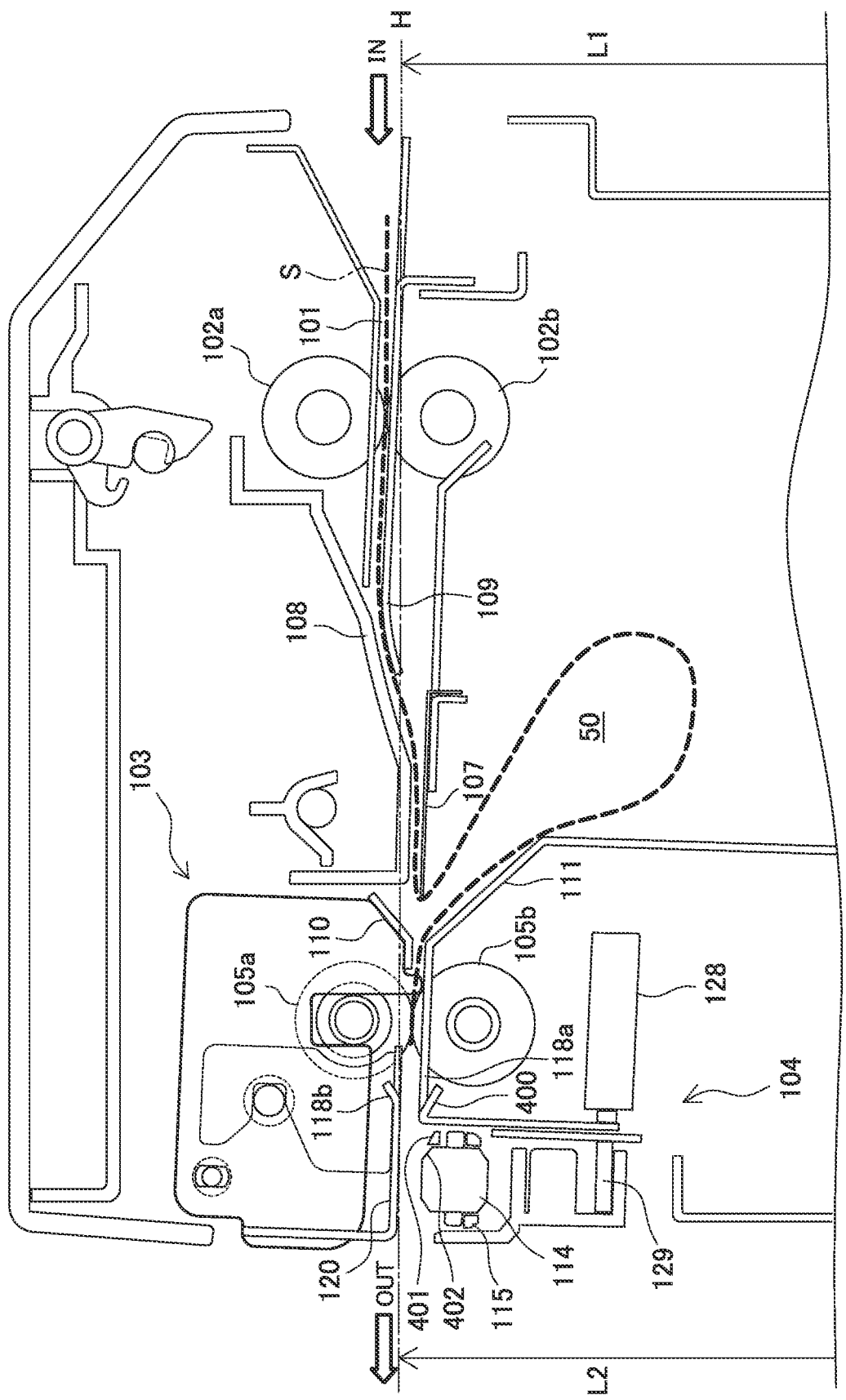
FIG. 11 is a view illustrating the cross section of the sheet folding apparatus and the height relation between the entrance and exit of the apparatus.

With reference to FIG. 11, the arrangement of the present embodiment will be described in more detail. Out of the components constituting the additional folding unit 104, the first moving mechanism 116 that moves to press the sheet S and the additional folding drive motor 128 that drives the moving mechanism are disposed in a direction coinciding with a direction in which a loop space 50 required for folding processing is formed. As illustrated in FIG. 11, the sheet S nipped by the folding roller pair 105 during folding processing is bent (see the dashed line in FIG. 11) in the loop space 50. The loop space 50 may be formed above the straight conveying path 101; however, in the present embodiment, the loop space 50 is provided below the straight conveying path 101 connecting the entrance and exit of the sheet folding apparatus, whereby it can be expected to smoothly form a loop by utilizing the gravitational force.

As the loop space 50, a space having a certain size needs to be provided inside the apparatus in order to maintain a bent state with a curvature as large as possible so as not to apply an excessive folding load to the sheet. When the additional folding unit 104 configured to reciprocate toward the conveying path is provided, a stoke between the activating position and the retreating position, and arrangement of a drive source required for moving the unit and a drive mechanism need to be taken into consideration. In the present embodiment, the loop space 50 requiring a certain size and the additional folding unit 104 are provided in the same direction and aligned at one side of the straight conveying path, whereby a compact configuration can be achieved.

Specifically, in the present embodiment, the loop space 50 is provided below the straight conveying path 101 and upstream relative to the lower folding roller 105b in the sheet conveying direction. Correspondingly, the moving mechanism of the additional folding unit 104 is provided downstream relative to the lower folding roller 105b in the sheet conveying direction. Thus, when viewed in the sheet conveying direction, the loop space 50 and the additional folding unit 104 overlap each other. More specifically, by substantially linearly arranging the loop space 50, lower folding roller 105b, and additional folding unit 104 along the sheet conveying direction in an overlapping manner, a compact configuration is achieved.

FIG. 9 is another embodiment of the additional folding unit. A roller taper part 402 is formed at the end portion of the additional folding roller 114. Further, on the upstream side of the roller taper part 402 in the sheet conveying direction, a holder taper part 401 is formed in an attachment holder for the additional folding roller 114.

The plurality of additional folding rollers 114 are rotatably arranged in a direction perpendicular to the sheet conveying direction. To increase productivity during additional folding, the movement stroke of the additional folding unit is desirably reduced as much as possible. At the same time, it is preferable to make the sheet unlikely to be caught by the additional folding unit that faces the sheet conveying path.

The following describes the details of the taper part of the additional folding unit for preventing sheet jam. FIG. 10 is a perspective view of the additional folding unit part. The sheet folded by the lower folding roller 105b (folding roller pair) is likely to be caught at its front end due to the above-mentioned arrangement position of the additional folding rollers 114. To prevent this, a taper guide 400, a holder taper part 401, and a roller taper part 402 are provided. The taper guide 400 prevents the sheet corner from being caught at the downstream portion of the lower folding roller 105b. The holder taper part 401 is formed in a roller holder to which the additional folding roller 114 is attached. The roller taper part 402 is formed in the additional folding roller 114 itself.

FIG. 9 is a view of the additional folding rollers 114 as viewed from the upstream side in the sheet conveying direction. The additional folding roller 114 is attached to an auxiliary member 113 (roller guide 113), and the additional folding roller 114 and the auxiliary member 113 are provided with the roller taper part 402 and the holder taper part 401, respectively. The holder taper part 401 is tapered such that the profile of the roller is reduced towards the upstream side in the sheet conveying direction, and the roller taper part 402 is also tapered such that the upstream portion in the sheet conveying direction goes downward. Further, the upstream side end portion in the sheet conveying direction of the roller taper part 402 is positioned inside the range covered by the holder taper part 401, making it possible to further reduce sheet jam. Moreover, the attachment groove formed in the auxiliary member 113 is not formed to extend downward from right above but to extend downward obliquely so as to leave a portion near the sheet conveying path as illustrated in FIG. 9, thereby making it possible to effectively prevent contact between the end portion of the additional folding roller 114 and the front end of the sheet being conveyed.

As illustrated in FIG. 1, the folding apparatus B is assumed to be installed between the image forming apparatus A and the post-processing apparatus C arranged at the following stage. This is because the folding apparatus B is provided as an additional option of post-processing apparatus. That is, there may be considered two cases of the image forming system with the folding apparatus B and that without the folding apparatus B. The folding apparatus B has the loop space 50 for the above-described folding processing, and the conveying path is formed so as to step down (see FIG. 11) in order to form the loop without giving a stress to the sheet. This causes a misalignment in height direction between the entrance and exit of the folding apparatus B, which may impair the versatility of the apparatus. To solve this, the conveying path is designed such that the height positions of the entrance and exit of the folding apparatus B are located on a virtual line H (long dashed short dashed line in FIG. 11) substantially parallel to an apparatus installation surface G. Specifically, the conveying path is: inclined upward by about 2° to 3° with respect to the horizontal in the area upstream of the loop space 50; inclined downward at the area around the loop space 50; and inclined upward in the area downstream of the loop space 50. Thus, despite the presence of the step around the loop space 50, a height L1 from the apparatus installation surface G to the entrance of the folding apparatus B and a height L2 from the apparatus installation surface G to the entrance of the post-processing apparatus C can be substantially equal to each other (L1≈L2).

Figure 12:
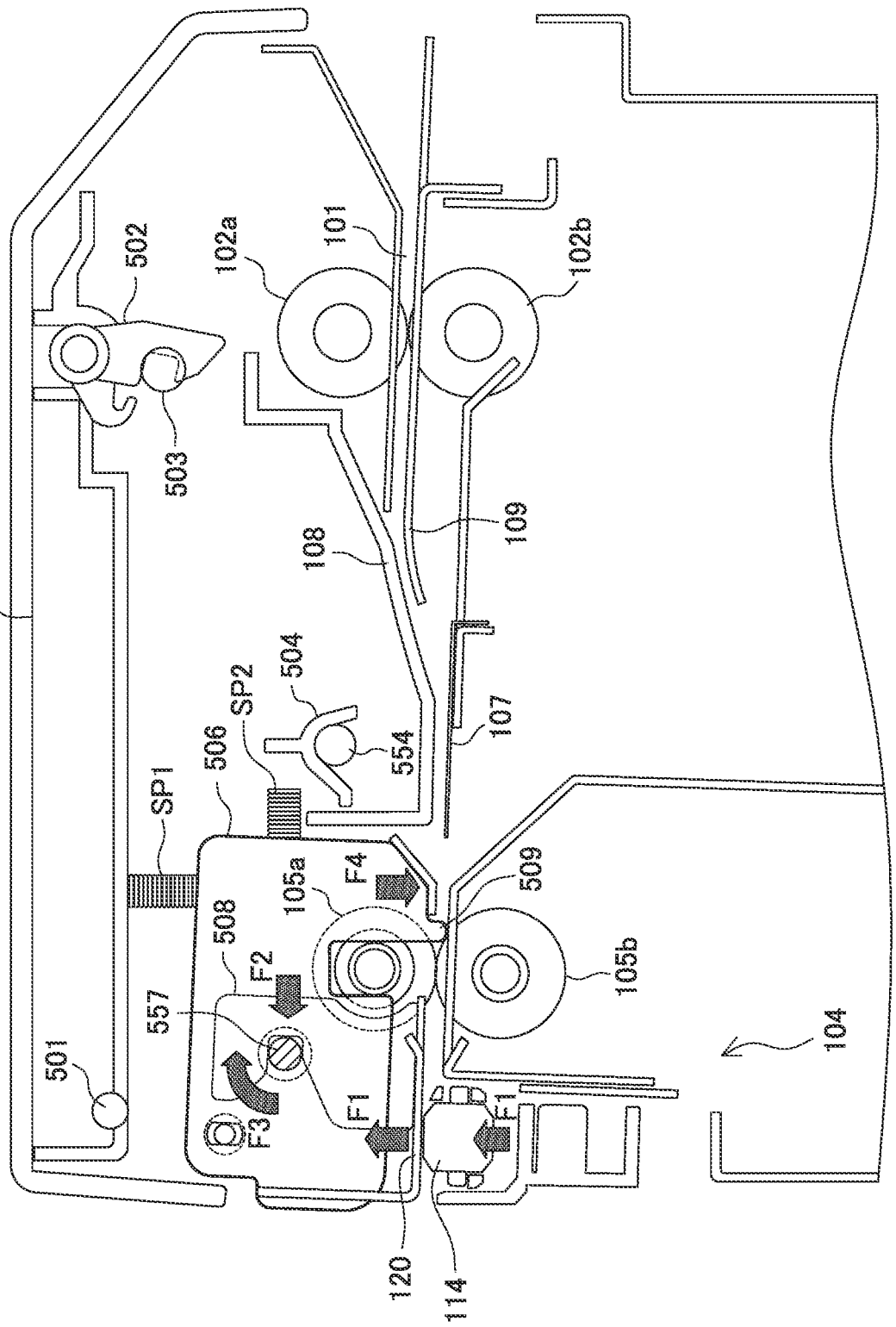
FIG. 12 is a view illustrating a state during a pressing operation of the additional folding unit.
Figure 13:
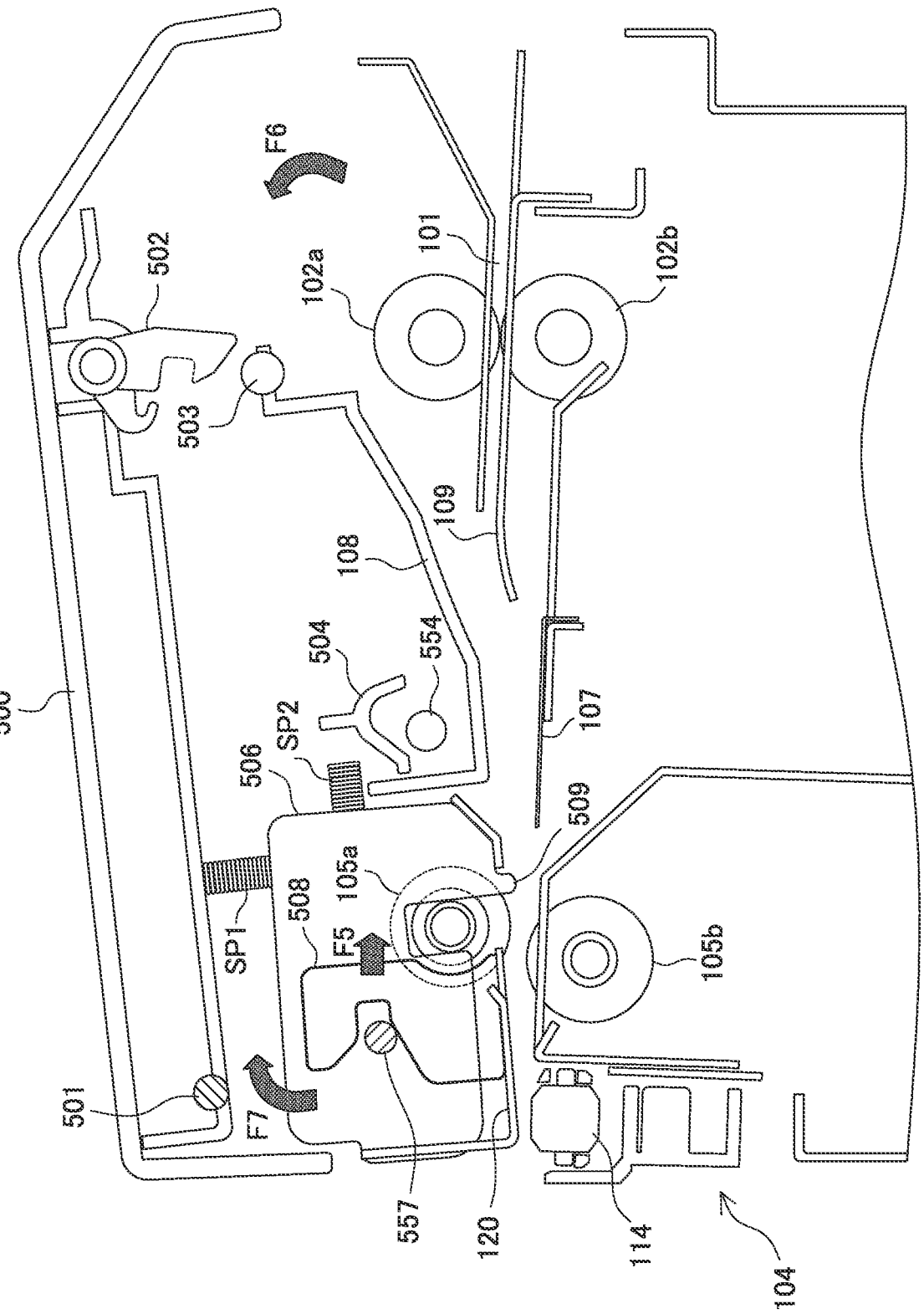
FIG. 13 is a view illustrating a state where a jam release cover covering a folding part and additional folding unit is to be opened.

FIGS. 12 and 13 are detailed views concerning a jam release mechanism of the additional folding unit 104. The folding apparatus B has a jam release cover 500 for releasing sheet jam during conveyance of the sheet. A not-shown external handle is operated to unlock a hook 502 engaged with a pin 503 provided to the main body of the folding apparatus B, causing the jam release cover 500 to turn about a turning fulcrum 501 to be opened, whereby the path passing through the folding roller pair 105 and additional folding part is released to allow removal of a residual sheet.

FIG. 13 illustrates a state where the jam release cover 500 is opened. With the turning of the jam release cover 500, an additional folding receiving unit 506 having the additional folding receiving member 120 and the upper conveying guide 108 are moved. The upper conveying guide 108 is moved integrally with an upper conveying guide cover positioning part 504 provided to the jam release cover 500. The upper conveying guide cover positioning part 504 is engaged with a conveying guide pin 554 provided to the apparatus main body to keep the interval (path) between the upper conveying guide 108 and the lower conveying guide 109 in a proper location.

The additional folding receiving unit 506 is attached to the jam release cover 500 and moved integrally therewith. However, the additional folding receiving unit 506 is not fixed in position but is positioned somewhat freely by springs SP1 and SP2.

The configuration of the additional folding receiving unit 506 will be described in more detail. The additional folding receiving unit 506 ensures a nip pressure of the folding roller pair 105 by means of the spring SP1. The rotation axis of the upper folding roller 105*a* is fixed to the additional folding receiving unit 506, and the upper folding roller 105*a* is pressed against the lower folding roller 105*b* by a spring pressure of the spring SP1, thereby providing an adequate nip pressure.

In the additional folding receiving unit 506 illustrated in FIG. 12, the additional folding receiving member 120 receives a pressing force from the additional folding rollers 114.

More specifically, as illustrated in FIG. 12, the additional folding receiving member 120 receives a pressing force (F1) from the additional folding rollers 114, and a turning guide 508 of the additional folding receiving unit 506 is pressed against a turning guide pin 557 provided to the apparatus main body by a pressing pressure (F2) of the spring S2. As a result, the force received by the additional folding receiving member 120 becomes a rotation moment (F3) about the turning guide 508 positioned on the upstream side in the sheet conveying direction, which is transmitted from a stopper 509 that the additional folding receiving unit 506 has to a metal sheet provided to the apparatus main body (F4), allowing the additional folding receiving unit 506 to be firmly positioned.

FIG. 13 illustrates a process of opening the jam release cover 500 as described above. At this time, the turning guide 508 is separated from the turning guide pin 557 and the additional folding receiving unit 506 connected with the springs SP1 and SP2 is lifted to be slightly moved in a rotation direction (F7) opposite to the turning direction (F5) of the jam release cover 500. With this configuration, it is possible to open the conveying path without further reducing the clearance between the additional folding rollers 114 and the additional folding receiving member 120 that is inevitably somewhat reduced. Thus, a jammed sheet can be prevented from being caught again, and even when sheet jam occurs in a state where the additional folding rollers 114 stop at the pressing position, jam release operation can be performed without giving a load to the apparatus. When the turning guide 508 is completely separated from the turning guide pin 557, the additional folding receiving unit 506 becomes in a floated state with respect to the jam release cover 500. When the jam release cover 500 is closed, the turning guide 508 and the turning guide pin 557 are gradually positioned in place.

With the movement of the additional folding rollers 114 along the fold, the additional folding unit 104 performs additional folding for a first fold in the forward traveling and performs additional folding for a second fold in the backward traveling when a plurality of folds are formed in one sheet S (as in a Z-folded sheet or an inwardly three-folded sheet). Thus, it is possible to perform additional folding processing for a plurality of folds by pressing different folds in the forward traveling and backward traveling. That is, it is possible to perform additional folding processing for a plurality of folds efficiently at short times while suppressing an increase in time required for the additional folding processing.

While, in the above description, the additional folding unit 104 performs additional folding processing for the Z-folded sheet, it can cope with a two-folded sheet, a sheet having three or more folds like a four-folded sheet, and the like. In a case where only one fold is formed in one sheet like a two-folded sheet, additional folding processing is first performed for the fold of a preceding sheet in the forward traveling, and after discharge of the preceding sheet, additional folding processing is performed for the fold of the succeeding sheet in the backward traveling, whereby additional folding processing can be efficiently performed for successively conveyed sheets at short times. Further, in a case where three or more folds are formed in one sheet like a four-folded sheet, the conveyance of the sheet is stopped every time the fold reaches above the additional folding rollers 114, and the additional folding rollers 114 are moved along the fold in the forward traveling or backward traveling to perform additional folding processing. In addition, a target of the folding processing may be a sheet bundle or a single sheet. The sheet bundle may be a bound sheet bundle or a sheet bundle that is not bound.

While a sheet pressing apparatus and an image forming system provided with the same have been described with reference to the illustrated embodiments, the present invention is not limited to the illustrated embodiments. For example, in the illustrated embodiments, the first moving mechanism 116 is constituted by the guide rail 123, slider 124, bracket 125, pulley 126, rack 127, additional folding drive motor 128, belt 129, contact piece 130, and the first and second slope parts of the cam groove 131, and the second moving mechanism 117 is constituted by the guide rail 123, slider 124, bracket 125, pulley 126, rack 127, additional folding drive motor 128, belt 129, contact piece 130, and the bottom horizontal part of the cam groove 131; however, the configurations of the first and second moving mechanisms 116 and 117 are not limited thereto as long as they can make the support member 112 approach/separate from the additional folding receiving member 120 and can move the support member 112 along the fold of the sheet S. For example, a linear motion mechanism may be employed as the first and second moving mechanisms 116 and 117. Further, in the illustrated embodiments, the additional folding rollers 114 are moved toward the additional folding receiving member 120; however, the additional folding receiving member 120 may be moved toward the additional folding rollers 114. As a matter of course, both the additional folding rollers 114 and the additional folding receiving member 120 may be moved toward each other. When the additional folding receiving member 120 is moved, it may be provided with an elevating mechanism. Further, not the additional folding rollers 114, but the additional folding receiving member 120 may be biased toward the additional folding rollers 114 by a spring.

In addition, this application claims priority from Japanese Patent Application No. 2020-104397 incorporated herein by reference.

The invention claimed is:

1. A sheet folding apparatus comprising:
a conveying roller that conveys a sheet in a predetermined conveying direction;
a folding roller pair that is disposed downstream relative to the conveying roller in the conveying direction and rotates while nipping a predetermined position of the sheet to form a fold at the predetermined position;
a conveying path for conveying the sheet in the conveying direction from the conveying roller to the folding roller pair;
an abutting member that moves downstream in the conveying direction and abuts against the predetermined position of the sheet to bend the sheet downstream such that the predetermined position moves to a position nipped by the folding roller pair; and
a loop space where the sheet is bent between the conveying roller and the folding roller pair in a direction crossing the conveying direction,
the folding roller pair stopping its rotation while nipping a front end of the sheet fed from the conveying roller to form a loop of the sheet hanging down in the loop space,
the abutting member moving so as to abut against the loop in the loop space from the upstream side in the conveying direction to move the predetermined position of the sheet to the position nipped by the folding roller pair,
the sheet folding apparatus further comprising:
a receiving port for receiving the sheet having a fold formed by the folding roller pair and fed in the conveying direction;
a support member that is disposed downstream relative to the receiving port in the conveying direction and is configured movable in a predetermined direction;
a first pressing member that is supported by the support member;
a second pressing member that is disposed so as to face the first pressing member across the sheet conveying path and presses the fold in cooperation with the first pressing member; and
a moving mechanism that moves the support member relative to the second pressing member to move the first pressing member relative to the second pressing member between a pressing position at which the fold of the sheet is pressed between the first and second pressing members and a retreating position obtained by moving the first pressing member from the pressing position in a direction separating from the second pressing member,
the loop space and the moving mechanism being disposed on one side relative to the sheet conveying path.

2. The sheet folding apparatus according to claim 1, wherein
the loop space and the moving mechanism are disposed below the sheet conveying path.

3. A sheet processing apparatus having the sheet folding apparatus as claimed in claim 2.

4. An image forming system comprising:
an image forming unit that forms an image on a sheet; and
the sheet folding apparatus as claimed in claim 2 that performs folding processing for a sheet fed from the image forming unit.

5. A sheet folding apparatus comprising:
a conveying roller that conveys a sheet in a predetermined conveying direction;
a folding roller pair that is disposed downstream relative to the conveying roller in the conveying direction and rotates while nipping a predetermined position of the sheet to form a fold at the predetermined position;
a conveying path for conveying the sheet in the conveying direction from the conveying roller to the folding roller pair;
an abutting member that moves downstream in the conveying direction and abuts against the predetermined position of the sheet to bend the sheet downstream such that the predetermined position moves to a position nipped by the folding roller pair; and
a loop space where the sheet is bent between the conveying roller and the folding roller pair in a direction crossing the conveying direction,
the folding roller pair stopping its rotation while nipping a front end of the sheet fed from the conveying roller to form a loop of the sheet hanging down in the loop space,
the abutting member moving so as to abut against the loop in the loop space from the upstream side in the conveying direction to move the predetermined position of the sheet to the position nipped by the folding roller pair,
the sheet folding apparatus further comprising:
a receiving port for receiving the sheet having a fold formed by the folding roller pair and fed in the conveying direction;
a support member that is disposed downstream relative to the receiving port in the conveying direction and is configured movable in a predetermined direction;
a first pressing member that is supported by the support member;
a second pressing member that is disposed so as to face the first pressing member across the sheet conveying path and presses the fold in cooperation with the first pressing member; and
a moving mechanism that moves the support member relative to the second pressing member to move the first pressing member relative to the second pressing member between a pressing position at which the fold of the sheet is pressed between the first and second pressing members and a retreating position obtained by moving the first pressing member from the pressing position in a direction separating from the second pressing member,
the moving mechanism being disposed downward of the loop space in the sheet conveying direction so as to overlap the loop space in the sheet conveying direction.

6. The sheet folding apparatus according to claim 5, wherein
the loop space and the moving mechanism are disposed below the sheet conveying path.

7. A sheet processing apparatus having the sheet folding apparatus as claimed in claim 6.

8. An image forming system comprising:
an image forming unit that forms an image on a sheet; and
the sheet folding apparatus as claimed in claim 6 that performs folding processing for a sheet fed from the image forming unit.

* * * * *